(12) United States Patent
Miyamoto et al.

(10) Patent No.: US 9,624,808 B2
(45) Date of Patent: Apr. 18, 2017

(54) ABNORMALITY DIAGNOSIS SYSTEM OF AIR-FUEL RATIO SENSOR

(71) Applicant: Toyota Jidosha Kabushiki Kaisha, Toyota-shi Aichi-ken (JP)

(72) Inventors: Hiroshi Miyamoto, Shizuoka-ken (JP); Kenji Suzuki, Susono (JP); Toru Kidokoro, Hadano (JP); Yasushi Iwazaki, Ebina (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/847,674

(22) Filed: Sep. 8, 2015

(65) Prior Publication Data

US 2016/0069242 A1    Mar. 10, 2016

(30) Foreign Application Priority Data

Sep. 9, 2014    (JP) .................................. 2014-183672

(51) Int. Cl.
| | | |
|---|---|---|
| *F01N 11/00* | (2006.01) | |
| *F02D 41/12* | (2006.01) | |
| *F02D 41/14* | (2006.01) | |

(52) U.S. Cl.
CPC ............ *F01N 11/00* (2013.01); *F02D 41/123* (2013.01); *F02D 41/1456* (2013.01); *F02D 41/1495* (2013.01); *F01N 2550/00* (2013.01); *F01N 2560/025* (2013.01); *F01N 2900/0416* (2013.01); *F01N 2900/0422* (2013.01); *F02D 2041/1431* (2013.01)

(58) Field of Classification Search
CPC ............ F02D 41/1456; F02D 41/1454; F02D 41/1458; G01M 15/104
USPC .................................. 60/285, 286, 276, 277
See application file for complete search history.

(56) References Cited

U.S. PATENT DOCUMENTS

| | | | | |
|---|---|---|---|---|
| 2008/0189008 A1* | 8/2008 | Iwazaki | ............... | F02D 41/1454 701/114 |
| 2010/0211290 A1* | 8/2010 | Kidokoro | ............ | F02D 41/1408 701/103 |

(Continued)

FOREIGN PATENT DOCUMENTS

| | | |
|---|---|---|
| JP | 2008-121524 A | 5/2008 |
| JP | 2008-190454 A | 8/2008 |

(Continued)

*Primary Examiner* — Patrick Maines
(74) *Attorney, Agent, or Firm* — Dinsmore & Shohl LLP

(57) ABSTRACT

An air-fuel ratio sensor is provided in an exhaust passage of an internal combustion engine which can perform fuel cut control, and detects an air-fuel ratio of exhaust gas. The system calculates the response time of the air-fuel ratio sensor based on a changing output value of the air-fuel ratio sensor while performing or after fuel cut control, and compares the calculated response time and a threshold value to diagnose an abnormality. The abnormality diagnosis system is configured to correct the response time so that the response of the air-fuel ratio sensor is treated as becoming faster, the smaller the lean degree of the air-fuel ratio corresponding to the converged value of the air-fuel ratio sensor during fuel cut control; and diagnose an abnormality in the response of the air-fuel ratio sensor based on the corrected calculated response time and threshold value.

10 Claims, 19 Drawing Sheets

(56) References Cited

U.S. PATENT DOCUMENTS

| | | | | |
|---|---|---|---|---|
| 2010/0212414 | A1* | 8/2010 | Nakamura | F01N 11/007 73/114.73 |
| 2013/0206596 | A1* | 8/2013 | Katsurahara | G01N 27/407 204/424 |
| 2014/0305103 | A1* | 10/2014 | Nakagawa | F02D 41/1441 60/286 |

FOREIGN PATENT DOCUMENTS

| JP | 2009-036038 A | 2/2009 |
|---|---|---|
| JP | 2011-106415 A | 6/2011 |
| JP | 2012-052462 A | 3/2012 |
| JP | 2012-211561 A | 11/2012 |

\* cited by examiner

ABNORMALITY DIAGNOSIS SYSTEM OF AIR-FUEL RATIO SENSOR

TECHNICAL FIELD

The present invention relates to an abnormality diagnosis system of an air-fuel ratio sensor.

BACKGROUND ART

Known in the past has been an internal combustion engine which is provided with an air-fuel ratio sensor in an exhaust passage of the internal combustion engine and is configured to control the amount of fuel which is fed to the internal combustion engine based on the output of this air-fuel ratio sensor, The air-fuel ratio sensor used in such an internal combustion engine gradually deteriorates along with use. As such deterioration, for example, deterioration in response of the air-fuel ratio sensor may be mentioned. Deterioration in response of the air-fuel ratio sensor occurs, for example, due to the air-holes, which are provided in the sensor cover for preventing the sensor element from being covered with water, being partially clogged by fine particles. If the air holes are partially clogged in this way, the exchange of gas between the inside and outside of the sensor cover becomes slow and, as a result, the response of the air-fuel ratio sensor is dulled. If such deterioration in response of the air-fuel ratio sensor occurs, the various types of control, which the control system of the internal combustion engine performs, is obstructed.

Therefore, an abnormality diagnosis system which diagnoses the abnormality of deterioration in response of the air-fuel ratio sensor has been proposed (for example, PTLs 1 to 4). As such an abnormality diagnosis system, for example, a system, which diagnoses abnormality of the air-fuel ratio sensor based on the change of output value of the air-fuel ratio sensor which change accompanies the start of fuel cut control for stopping the feed of fuel to a combustion chamber, has been proposed (for example, PTL 1).

In particular, in the abnormality diagnosis system described in PTL 1, the response time from the start of fuel cut control to when the output voltage of the air-fuel ratio sensor falls to a prescribed value, is measured and the response time, is corrected based on the relationship between the response time and the average amount of intake air. Further, when the thus corrected response time is a predetermined reference response time or more, it is judged that the air-fuel ratio sensor has become abnormal. According to PTL 1, due to this abnormality diagnosis system, even if the air-fuel ratio sensor is a downstream side air-fuel ratio sensor provided at a downstream side, in the exhaust flow direction, of the exhaust purification catalyst, it is considered possible to diagnose abnormality of the downstream side air-fuel ratio sensor without being affected by deterioration of the exhaust purification catalyst.

CITATION LIST

Patent Literature

PTL 1. Japanese Patent Publication No. 2012-211561A
PTL 2. Japanese Patent Publication No. 2008-190454A
PTL 3. Japanese Patent Publication No. 2011-106415A
PTL 4. Japanese Patent Publication No. 2012-052462A

SUMMARY OF INVENTION

Technical Problem

In this regard, as explained above, the abnormality of deterioration in response in an air-fuel ratio sensor is diagnosed based on the time (response time) which is taken for the output voltage of the air-fuel ratio sensor to change by exactly a predetermined value, when changing the air-fuel ratio of the exhaust gas flowing around the air-fuel ratio sensor change. In this regard, this response time changes due to not only deterioration in response of the air-fuel ratio sensor, but also other factors. As such other factors, the output gain of the air-fuel ratio sensor may be mentioned.

The output gain of an air-fuel ratio sensor changes due to, for example, manufacturing variations in the air-fuel ratio sensor causing the distance of diffusion of the diffusion regulation layer which is used in the air-fuel ratio sensor to differ for each specimen of air-fuel ratio sensor. Further, the output gain of the air-fuel ratio sensor also changes depending on the pressure of the exhaust gas around the air-fuel ratio sensor, etc. In this way, the above-mentioned response time changes in accordance with the output gain of the air-fuel ratio sensor, and therefore sometimes the abnormality of deterioration in the response of the air-fuel ratio sensor cannot be accurately diagnosed by the above-mentioned abnormality diagnosis.

Therefore, in view of the above problem, an object of the present invention is to provide an abnormality diagnosis system which can accurately diagnose an abnormality due to deterioration in response at an air-fuel ratio sensor even if the output gain of the air-fuel ratio sensor changes.

Solution to Problem

To solve the above problem, in a first aspect of the invention, there is provided an abnormality diagnosis system of an stir-fuel ratio sensor, which sensor is provided in an exhaust passage of an internal combustion engine, which can perform fuel cut control, which stops or reduces feed of fuel to a combustion chamber, and which sensor detects an air-fuel ratio of exhaust gas flowing through the exhaust passage, wherein the abnormality diagnosis system is configured, to calculate a response parameter which shows a response of said air-fuel ratio sensor, based on an output value of the air-fuel ratio sensor in the time period during which the output value of the air-fuel ratio sensor changes along with the start of performance or end of performance of the fuel cut control; compare a calculated value of the response parameter and a predetermined threshold value to diagnose an abnormality relating to response of the air-fuel ratio sensor; detect a converged value when an output value of the air-fuel ratio sensor converges to a value corresponding to a lean air-fuel ratio which is leaner than a stoichiometric air-fuel ratio during the fuel cut control; correct, at least one of a value of the response parameter, a value of a parameter which is used for calculation of the response parameter, and the threshold value so that the smaller the lean degree of the air-fuel ratio which corresponds to the detected converged value becomes, the faster the response of the air-fuel ratio sensor is treated as compared with the response which corresponds to the value of the calculated response parameter; and diagnose abnormality of the response of the air-fuel ratio sensor based on the value of the response parameter calculated after the correction and said threshold value.

In a second aspect, of the invention, there is provided the first aspect of the invention wherein the response parameter is an output changing time which is taken for an output value of the air-fuel ratio sensor to change from a low lean reference value which corresponds to a lean air-fuel ratio to a high lean reference value which corresponds to an air-fuel ratio which is leaner than the air-fuel ratio which corresponds to the low lean reference value during that time period along with the start of the fuel cut control or an output changing time which is taken for an output value of the air-fuel ratio sensor to change from the high lean reference value to the low lean reference value during that time period along with the end of the fuel cut control, and the abnormality diagnosis system judges that the air-fuel ratio sensor has become abnormal when the output changing time is equal to or greater than a predetermined threshold value.

In a third aspect of the invention, there is provided the second aspect, of the invention wherein the abnormality diagnosis system corrects the output changing time to make it shorter or corrects the threshold value to make it larger, the smaller the lean degree of the air-fuel ratio corresponding to the detected converged value.

In a fourth aspect of the invention, there is provided the first aspect of the invention wherein the response parameter is a rate of change with time of an output value of said air-fuel ratio sensor while the output value changes from a low lean reference value which corresponds to a lean air-fuel ratio to a high lean reference value which corresponds to an air-fuel ratio leaner than an air-fuel ratio corresponding to the low-lean reference value, during that time period, along with the start of the fuel cut control, or a rate of change with time of the output value while an output value of the air-fuel ratio sensor changes from the high lean reference value to the low lean reference value, during that time period, along with the end of the fuel cut control, and the abnormality diagnosis system judges that the air-fuel ratio sensor has become abnormal when the rate of change with time is equal to or less than a predetermined threshold value.

In a fifth aspect of the invention, there is provided the fourth aspect of the invention, wherein the abnormality diagnosis system corrects the rate of change with time to become larger or corrects the threshold value to become smaller the smaller the lean degree of the air-fuel ratio corresponding to the detected converged value.

In a sixth aspect of the invention, there is provided the second or the fourth aspect of the invention, wherein the abnormality diagnosis system corrects the low lean reference value and high lean reference value so that the smaller the lean degree of the air-fuel ratio which corresponds to the detected converged value, the smaller the difference between the air-fuel ratio which corresponds to the low lean reference value and the air-fuel ratio which corresponds to the high lean reference value.

In a seventh aspect of the invention, there is provided any one of the first to sixth aspects of the invention, wherein as the converged value of the output value of the air-fuel ratio sensor during the fuel cut control, an average value of output values of the air-fuel ratio sensor in a measurement period from when it is judged an output value of the air-fuel ratio sensor has converged during the fuel cut control to when a predetermined time has elapsed therefrom is used, and the air-fuel ratio sensor is not diagnosed for abnormality when the value of a parameter which shows fluctuation of the output value of the air-fuel ratio sensor during the measurement period is a value which shows that fluctuation of the output value is larger than a diagnosis suspension reference value.

In an eighth aspect of the invention, there is provided any one of the first to the seventh aspects of the invention, wherein the abnormality diagnosis system does not diagnose abnormality of the air-fuel ratio sensor when the converged value is a value outside a predetermined range.

Advantageous Effects of Invention

According to the present invention, there is provided an abnormality diagnosis system which can accurately judge abnormality due to deterioration in response at an air-fuel ratio sensor even, if an output gain of the air-fuel ratio sensor changes.

DESCRIPTION OF EMBODIMENTS

Figure 1:
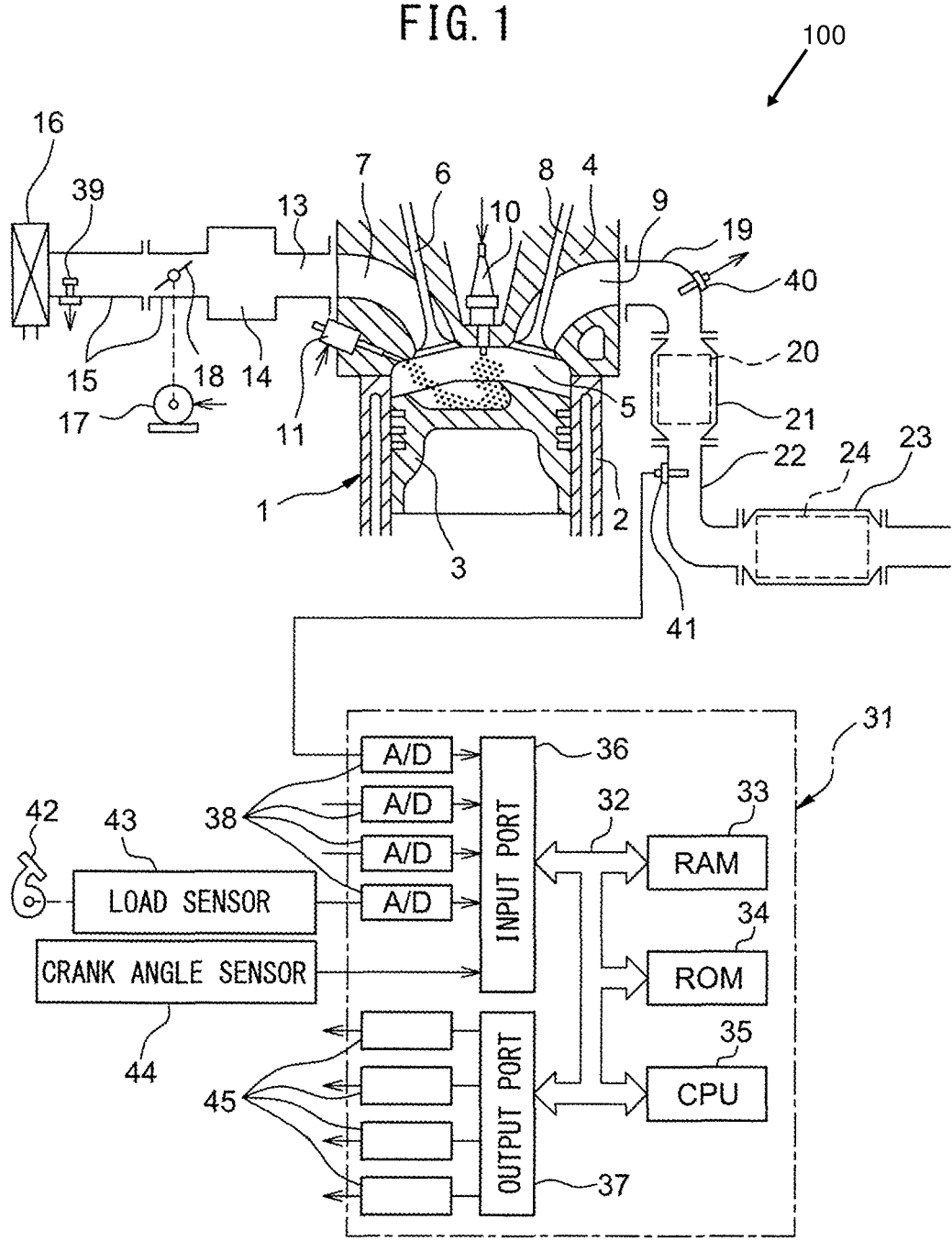
FIG. 1 is a view which schematically shows an internal combustion engine in which an abnormality diagnosis system of the present invention is used.

Below, referring to the drawings, an embodiment of the present invention will be explained, in detail. Note that, in the following explanation, similar component elements are assigned the same reference numerals.

<Explanation of Internal Combustion Engine as a Whole>

FIG. 1 is a view which schematically shows an internal combustion engine in which an abnormality diagnosis system 100 of an air-fuel ratio sensor according to a first embodiment of the present invention is used. Referring to FIG. 1, 1 indicates an engine body, 2 a cylinder block, 3 a piston which reciprocates inside the cylinder block 2, 4 a cylinder head which is fastened to the cylinder block 2, 5 a combustion chamber which is formed between the piston 3 and the cylinder head 4, 6 an intake valve, 7 an intake port, 8 an exhaust valve, and 9 an exhaust port. The intake valve 6 opens and closes the intake port 7, while the exhaust valve 8 opens and closes the exhaust port 9.

As shown in FIG. 1, a spark plug 10 is arranged at a center part of an inside wall surface of the cylinder head 4, while a fuel injector 11 is arranged at a side part of the inner wall surface of the cylinder head 4. The spark plug 10 is configured to generate a spark in accordance with an ignition signal. Further, the fuel injector 11 injects a predetermined amount of fuel into the combustion chamber 5 in accordance with an injection signal. Note that, the fuel injector 11 may also be arranged so as to inject fuel into the intake port 7. Further, in the present embodiment, as the fuel, gasoline with a stoichiometric air-fuel ratio of 14.6 is used. However, the internal combustion engine using the abnormality diagnosis system of the present invention may also use another fuel.

The intake port 7 of each cylinder is connected to a surge tank 14 through a corresponding intake runner 13, while the surge tank 14 is connected to an air cleaner 16 through an intake pipe 15. The intake port 7, intake runner 13, surge tank 14, and intake pipe 15 form an intake passage. Further, inside the intake pipe 15, a throttle valve 18 which is driven by a throttle valve drive actuator 17 is arranged. The throttle valve 18 can be operated by the throttle valve drive actuator 17 to thereby change the aperture area of the intake passage.

On the other hand, the exhaust port 9 of each cylinder is connected to an exhaust manifold 19. The exhaust manifold 19 has a plurality of runners which are connected to the exhaust ports 9 and a header at which these runners are collected. The header of the exhaust manifold 19 is connected to an upstream side casing 21 which houses an upstream side exhaust purification catalyst 20. The upstream side casing 21 is connected through an exhaust pipe 22 to a downstream side casing 23 which houses a downstream side exhaust purification catalyst 24. The exhaust port 9, exhaust manifold 19, upstream side casing 21, exhaust pipe 22, and downstream side casing 23 form an exhaust passage.

The electronic control unit (ECU) 31 is comprised of a digital computer which is provided with components which are connected together through a bidirectional bus 32 such as a RAM (random access memory) 33, ROM (read only memory) 34, CPU (microprocessor) 35, input port 36, and output port 37. In the intake pipe 15, an air flow meter 39 is arranged for detecting the flow rate of air which flows through the intake pipe 15. The output of this air flow meter 39 is input through a corresponding AD converter 38 to the input port 36. Further, at the header of the exhaust, manifold 19, an upstream, side air-fuel ratio sensor 40 is arranged which detects the air-fuel ratio of the exhaust gas which flows through the inside of the exhaust manifold 19 (that is, the exhaust gas which flows into the upstream side exhaust purification catalyst 20). In addition, in the exhaust pipe 22, a downstream side air-fuel ratio sensor 41 is arranged which detects the air-fuel ratio of the exhaust gas which flows through the inside of the exhaust pipe 22 (that is, the exhaust gas which flows out from the upstream side exhaust purification catalyst 20 and flows into the downstream side exhaust purification catalyst 24). The outputs of these air-fuel ratio sensors 40 and 41 are also input through the corresponding AD converters 38 to the input port 36. Note that, the configurations of these air-fuel ratio sensors 40 and 41 will be explained later.

Further, an accelerator pedal 42 has a load sensor 43 connected to it which generates an output voltage which is proportional to the amount of depression of the accelerator pedal 42. The output voltage of the load sensor 43 is input to the input port 36 through a corresponding AD converter 38. The crank angle sensor 44 generates an output pulse every time, for example, a crankshaft rotates by 15 degrees. This output pulse is input to the input port 36. The CPU 35 calculates the engine speed from the output pulse of this crank angle sensor 44. On the other hand, the output port 37 is connected through corresponding drive circuits 45 to the spark plugs 10, fuel injectors 11, and throttle valve drive actuator 17. Note that, ECU 31 acts as a control system for controlling the internal combustion engine.

The exhaust purification catalysts 20 and 24 are three-way catalysts which have oxygen storage abilities. Specifically, the exhaust purification catalysts 20 and 24 are comprised of carriers which are comprised of ceramic on which a precious metal which has a catalytic action (for example, platinum (Pt)) and a substance which has an oxygen storage ability (for example, ceria ($CeO_2$)) are carried. The exhaust purification catalysts 20 and 24 exhibit a catalytic action of simultaneously removing unburned gas (HC, CO, etc.) and nitrogen oxides ($NO_X$) when reaching a predetermined activation temperature and, in addition, an oxygen storage ability.

According to the oxygen storage ability of the exhaust, purification catalysts 20 and 24, the exhaust purification catalysts 20 and 24 store the oxygen in the exhaust gas when the air-fuel ratio of the exhaust gas which flows into the exhaust purification catalysts 20 and 24 is an air-fuel ratio leaner than the stoichiometric air-fuel ratio (hereinafter, also referred to as "lean air-fuel ratio"). On the other hand, the exhaust purification catalysts 20 and 24 release the oxygen which is stored in the exhaust purification catalysts 20 and 24 when the inflowing exhaust gas has an air-fuel ratio richer than the stoichiometric air-fuel ratio (hereinafter, also referred to as "rich air-fuel ratio"). As a result, as long as the oxygen storage ability of the exhaust purification catalysts 20 and 24 is maintained, the exhaust gas flowing out from the exhaust purification catalysts 20 and 24 has substantially stoichiometric air fuel ratio, regardless the air-fuel ratio of the exhaust gas flowing into the exhaust purification catalyst 20 and 24.

<Explanation of Air-Fuel Ratio Sensor>

Figure 2:
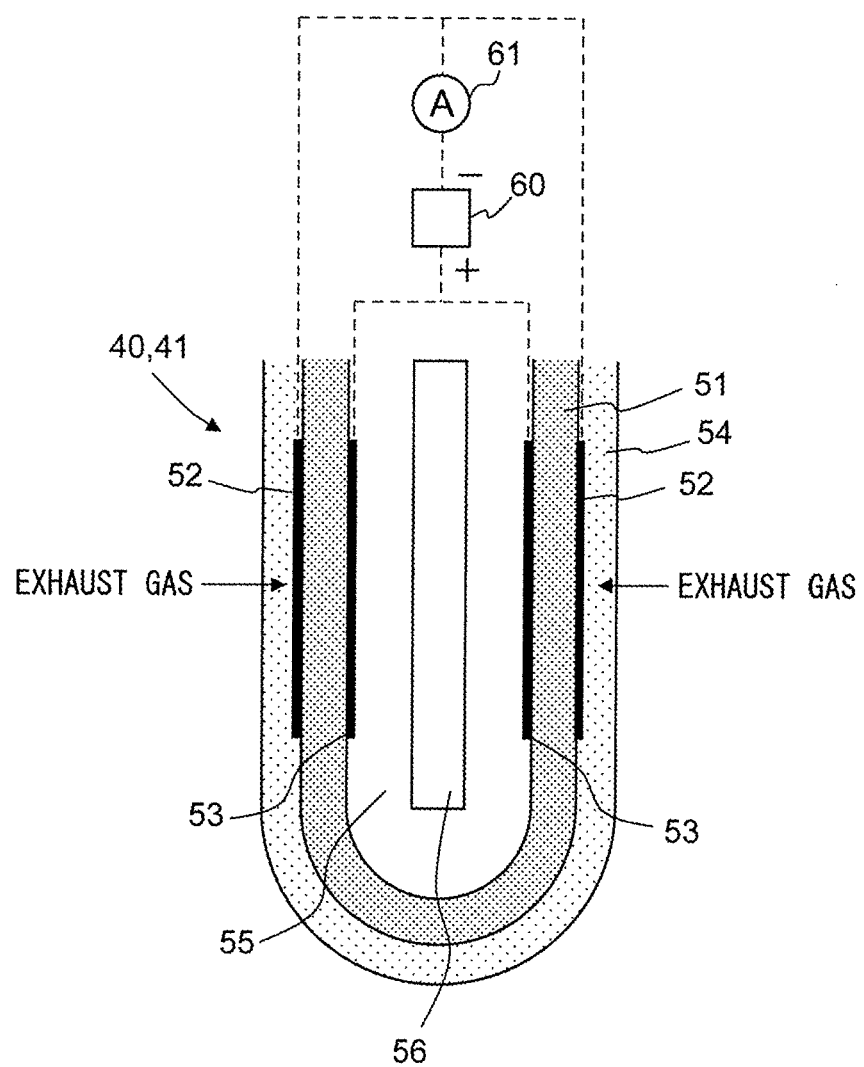
FIG. 2 is a view which schematically shows the structure of an air-fuel ratio sensor.

In the present embodiment, as the air-fuel ratio sensors 40 and 41, cup type limit current type air-fuel ratio sensors are used. FIG. 2 will be used to simply explain the structures of the air-fuel ratio sensors 40 and 41. Each of the air-fuel ratio sensors 40 and 41 is provided with a solid electrolyte layer 51, an exhaust side electrode 52 which is arranged on one side surface of the same, an atmosphere side electrode 53 which is arranged on the other side surface, a diffusion regulation layer 54 which regulates the diffusion of the flowing exhaust gas, a reference gas chamber 55, and a heater part 56 which heats the air-fuel ratio sensor 40 or 41, in particular the electrolyte layer (element) 51 thereof.

In each of the cup type air-fuel ratio sensors 40 and 41 of the present embodiment, the solid electrolyte layer 51 is formed into a cylindrical shape with one closed end. Inside of the reference gas chamber 55 which is defined inside of it, atmospheric gas (air) is introduced and the heater part 56 is arranged. On the inside surface of the solid electrolyte layer 51, an atmosphere side electrode 53 is arranged. On the outside surface of that, an exhaust side electrode 52 is arranged. On the outside surfaces of the solid electrolyte layer 51 and the exhaust side electrode 52, a diffusion regulation layer 54 is arranged to cover the same. Note that, at the outside of the diffusion regulation layer 54, a protective layer (not shown) may be provided for preventing a liquid etc. from depositing on the surface of the diffusion regulation layer 54.

The solid electrolyte layer 51 is formed by a sintered body of $ZrO_2$ (zirconia), $HfO_2$, $ThO_2$, $Bi_2O_3$, or other oxygen ion conducting oxide in which CaO, MgO, $Y_2O_3$, $Yb_2O_3$, etc. is blended as a stabilizer. Further, the diffusion regulation layer 54 is formed by a porous sintered body of alumina, magnesia, silica, spinel, mullite, or another heat resistant inorganic substance. Furthermore, the exhaust side electrode 52 and atmosphere side electrode 53 is formed by platinum or other precious metal with a high catalytic activity.

Further, between the exhaust side electrode 52 and the atmosphere side electrode 53, sensor voltage V is supplied by the voltage control device 60 which is mounted on the ECU 31. In addition, the ECU 31 is provided with a current detection device 61 which detects the current which flows between these electrodes 52 and 53 through the solid electrolyte layer 51 when the voltage supply device 60 supplies the sensor voltage by the voltage control device 60. The current which is detected by this current detection device 61 is the output current of the air-fuel ratio sensors 40 and 41.

Figure 3:
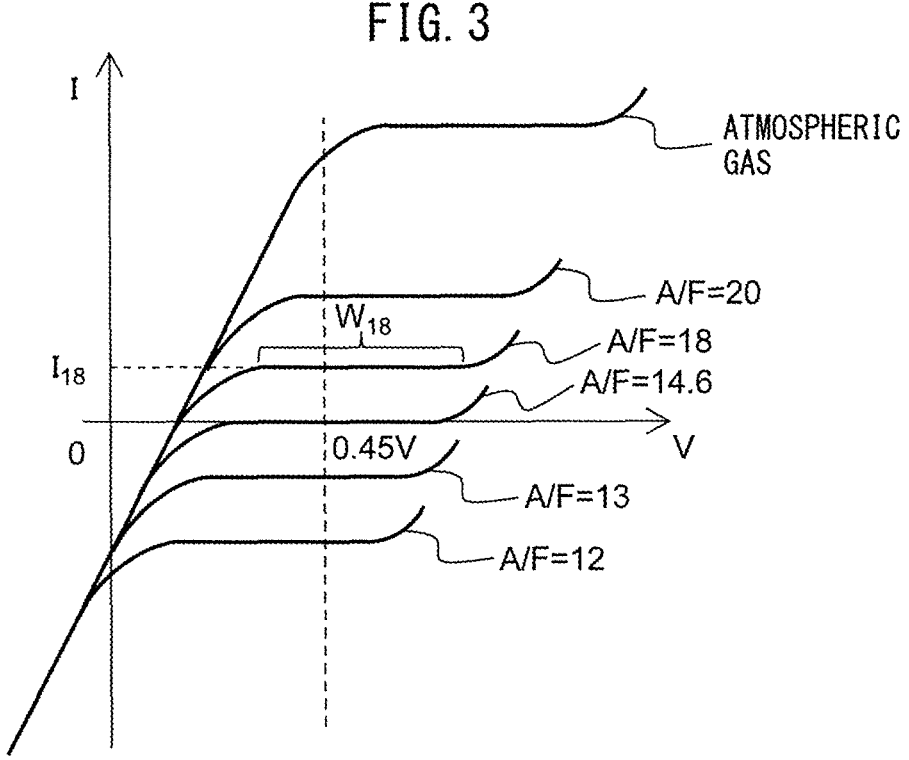
FIG. 3 is a view which shows a relationship between a sensor applied voltage and output current at different exhaust air-fuel ratios.

The thus configured air-fuel ratio sensors 40 and 41 have the voltage-current (V-I) characteristic such as shown in FIG. 3. As will be understood from FIG. 3, the output current I becomes larger the higher the exhaust air-fuel ratio (the leaner). Further, at the line V-I of each exhaust air-fuel ratio, there is a region. parallel to the V axis, that is, a region where the output current does not change much at all even if the sensor voltage changes. This voltage region is called the "limit current region". The current at this time is called the "limit current". In FIG. 3, the limit current region and limit current when the exhaust air-fuel ratio is 18 are shown by $W_{18}$ and $I_{18}$.

On the other hand, in the region where the sensor applied voltage is lower than the limit current region, the output current changes substantially proportionally to the sensor applied voltage. Below, this region will be referred to as the "proportional region". The slope at this time is determined by the DC element resistance of the solid electrolyte layer 51. Further, in the region where the sensor applied voltage is higher than the limit current region, the output current also increases along with the increase in the sensor applied voltage. In this region, breakdown of the moisture, which is contained in the exhaust gas, on the exhaust side electrode 52, etc., causes the output voltage to change according to change of the sensor applied voltage. Below, this region will be referred to as the "moisture breakdown region".

Figure 4:
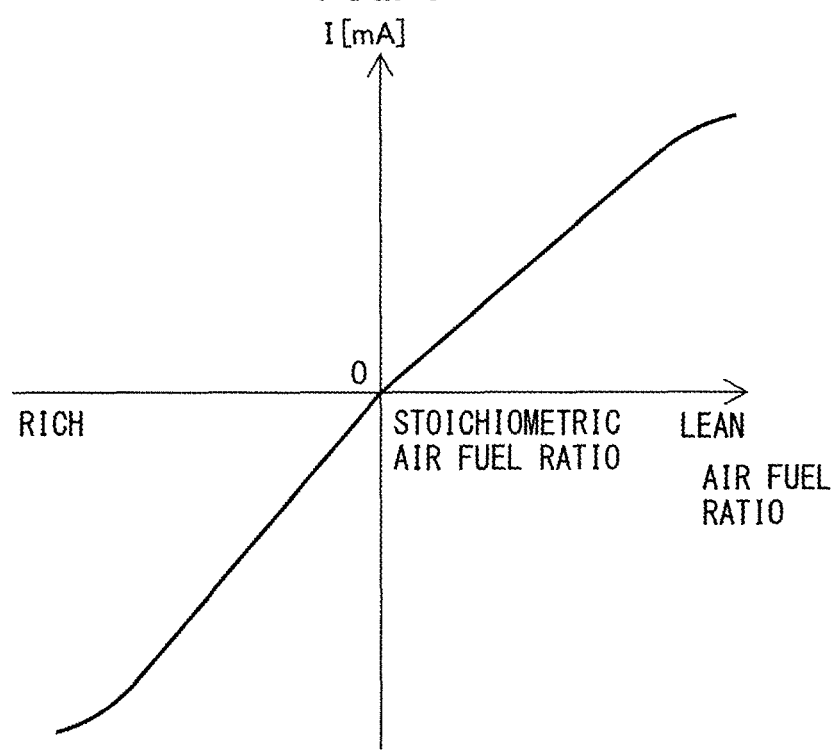
FIG. 4 is a view which shows a relationship between an exhaust air-fuel ratio and output current when making the sensor applied voltage constant.

FIG. 4 is a view which shows the relationship between the exhaust air-fuel ratio and the output current I when making the, supplied voltage constant at about 0.45V. As will be, understood from FIG. 4, in the air-fuel ratio sensors 40 and 41, the output current I changes linearly (proportionally) with respect to the exhaust air-fuel ratio so that the higher the exhaust air-fuel ratio (that is, the leaner), the greater the output current I from the air-fuel ratio sensors 40 and 41. In addition, the air-fuel ratio sensors 40 and 41 are configured so that the output current I becomes zero when the exhaust air-fuel ratio is the stoichiometric air-fuel ratio. Further, when the exhaust air-fuel ratio becomes larger by a certain extent or more or when, it becomes smaller by a certain extent or more, the ratio of change of the output current to the change of the exhaust air-fuel ratio becomes smaller.

Note that, in the above example, as the air-fuel ratio sensors 40 and 41, limit current type air-fuel ratio sensors of the structure shown in FIG. 2 are used. However, any type of air-fuel ratio sensor can be used as the air-fuel ratio sensors 40 and 41, as long as the output current linearly changes with respect to the exhaust air-fuel ratio. Therefore, as the air-fuel ratio sensors 40 and 41, for example, it is also possible to use a layered-type limit current type air-fuel ratio sensor or other structure of limit current type air-fuel ratio sensor or air-fuel ratio sensor not a limit current type or any other air-fuel ratio sensor, Further, the air-fuel ratio sensors 40 and 41 may be air-fuel ratio sensors having different construction from each other.

<Basic Air-Fuel Ratio Controls>

In the thus configured internal combustion engine, based on the outputs of the two air-fuel ratio sensors 40, 41, the amount of fuel injection from the fuel injector 11 is set so that the air-fuel ratio of the exhaust gas flowing into the upstream side exhaust purification catalyst 20 becomes the optimum air-fuel ratio which is based on the engine operating state. In the present embodiment, the output current of the upstream side air-fuel ratio sensor 40 (corresponding to air-fuel ratio of exhaust gas flowing into upstream side exhaust purification catalyst 20 or air-fuel ratio of exhaust gas flowing out from engine body) is feedback controlled so that this output current becomes a value corresponding to the target air-fuel ratio. In addition, the target air-fuel ratio is changed based on the output current of the downstream side air-fuel ratio sensor 41.

Figure 5:
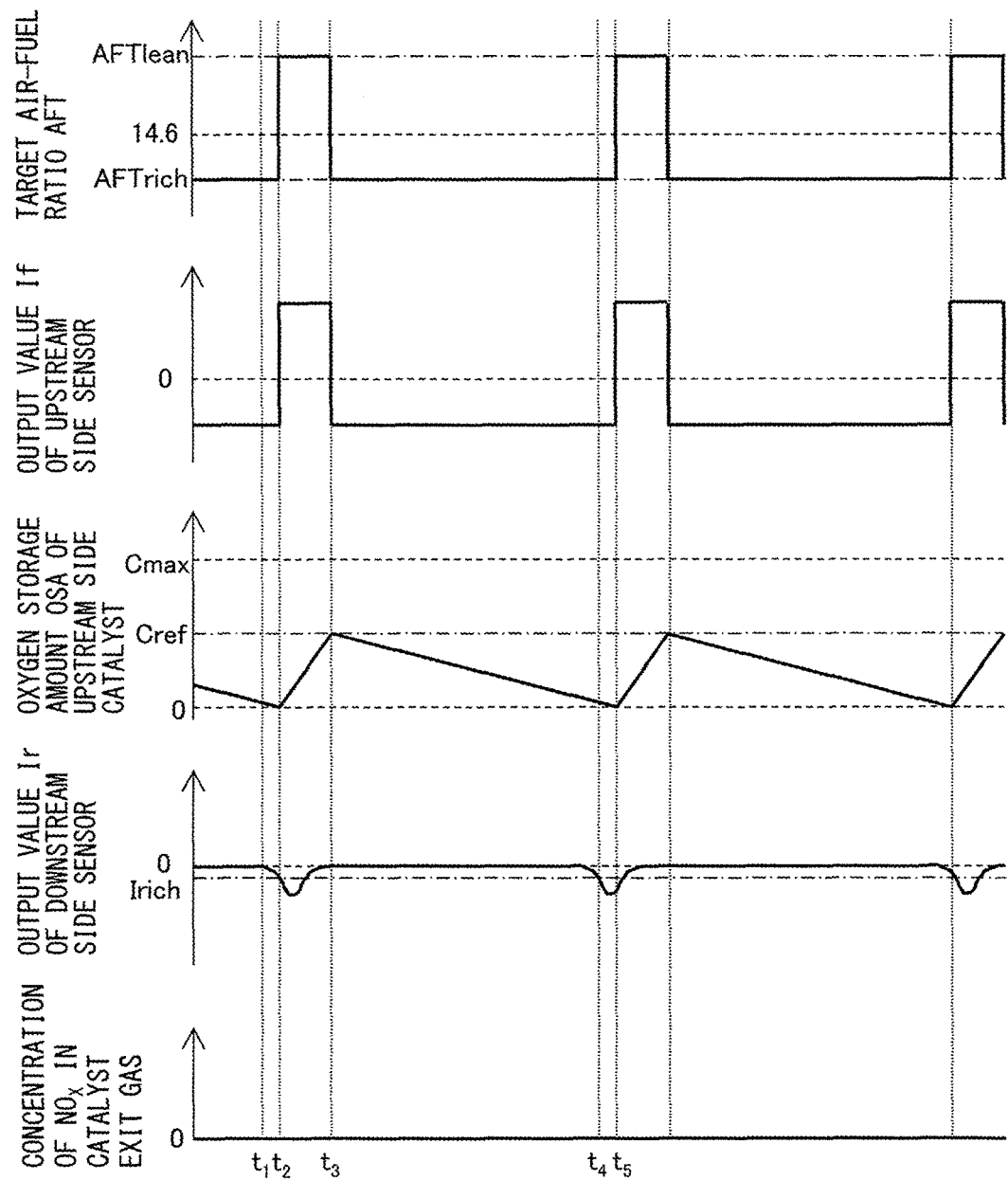
FIG. 5 is a time chart of a target air-fuel ratio, etc., at the time of normal operation of an internal combustion engine.

Referring to FIG. 5, such an example of control of the target air-fuel ratio will be simply explained. FIG. 5 is a time chart of the target air-fuel ratio AFT, the output current (output value) If of the upstream side air-fuel ratio sensor 40, the oxygen storage amount OSA of the upstream side exhaust purification catalyst, and the output current (output value) Ir of the downstream side air-fuel ratio sensor 41, at the time of ordinary operation of the internal combustion engine.

Note that, the output currents of the air-fuel ratio sensors 40, 41, as shown in FIG. 4, become zero when the air-fuel ratio of the exhaust gas flowing around the air-fuel ratio sensors 40, 41 is the stoichiometric air-fuel ratio. In addition, they become negative values when the air-fuel ratio of the exhaust gas is the rich air-fuel ratio, and become positive values when the air-fuel ratio of the exhaust gas is the lean air-fuel ratio. Further, when the air-fuel ratio of the exhaust gas flowing around the air-fuel ratio sensors 40, 41 is the rich air-fuel ratio or lean air-fuel ratio, the larger the difference from the stoichiometric air-fuel ratio becomes, the larger the absolute values of the output currents of the air-fuel ratio sensors 40, 41 become. Further, the "time of normal operation (normal control)" means the operating state (control state) where control for adjusting the amount of fuel injection in accordance with a specific operating state of the Internal combustion engine (for example, correction for Increasing amount of fuel injection performed at time of acceleration of vehicle mounting internal combustion engine or fuel cut control which will be explained later, etc.) is not being performed.

In the example shown in FIG. 5, when the output current Ir of the downstream side air-fuel ratio sensor 41 becomes equal to or less than a rich judgment reference value Irich smaller than zero, the target air-fuel ratio is set to and maintained at a lean set air-fuel ratio AFTlean (for example, 15) which is leaner than the stoichiometric air-fuel ratio, In this regard, the rich judgment reference value Irich is a value which corresponds to a predetermined rich judgment air-fuel ratio (for example, 14.55) which is slightly richer than the stoichiometric air-fuel ratio.

Then, the oxygen storage amount of the upstream side exhaust purification catalyst 20 is estimated. If this estimated value is equal to or greater than a predetermined judgment reference storage amount. Cref (amount smaller than maximum storable oxygen amount Cmax), the target air-fuel ratio is set and maintained at, a rich set air-fuel ratio AFTrich (for example, 14.4) which is richer than the stoichiometric air-fuel ratio. In the example shown in FIG. 5, this operation is repeatedly performed.

Specifically, in the example shown in FIG. 5, before the time $t_1$, the target air-fuel ratio AFT is set to the rich set air-fuel ratio AFTrich and, accordingly, the output current If of the upstream side air-fuel ratio sensor 40 is a value smaller than zero (corresponding to rich air-fuel ratio). Further, the upstream side exhaust purification catalyst 20 stores oxygen, and therefore the output current Ir of the downstream side air-fuel ratio sensor 41 becomes substantially zero (corresponding to stoichiometric air-fuel ratio). At this time, the air-fuel ratio of the exhaust gas flowing into the upstream side exhaust purification catalyst 20 becomes a rich air-fuel ratio, and therefore the upstream side exhaust purification catalyst 20 gradually falls in oxygen storage amount.

Then, at the time $t_1$, the oxygen storage amount of the upstream side exhaust purification catalyst 20 approaches zero, whereby part of the unburned gas flowing into the upstream side exhaust purification catalyst 20 starts to flow out without being purified at the upstream side exhaust purification catalyst 20. As a result, at the time $t_2$, the output current Ir of the downstream side air-fuel ratio sensor 41 becomes equal to or less than the rich judgment reference value Irich (corresponding to rich judgment reference air-fuel ratio). At this time, the target air-fuel ratio is switched from the rich set air-fuel ratio AFTrich to the lean set air-fuel ratio AFTlean.

By switching the target air-fuel ratio, the air-fuel ratio of the exhaust gas flowing into the upstream side exhaust purification catalyst 20 becomes a lean air-fuel ratio, and the outflow of unburned gas decreases and stops. Further, the oxygen storage amount OSA of the upstream side exhaust purification catalyst 20 gradually increases and, at the time $t_3$, reaches the judgment reference storage amount Cref. If, in this way, the oxygen storage amount reaches the judgment reference storage amount Cref, the target air-fuel ratio again is switched from the lean set air-fuel ratio AFTlean to the rich set air-fuel ratio AFTrich. By this switching of the target air-fuel ratio, the air-fuel ratio of the exhaust gas flowing into the upstream side exhaust purification catalyst 20 again becomes a rich air-fuel ratio. As a result, the oxygen storage amount of the upstream side exhaust purification catalyst 20 gradually decreases. Then, such operation is repeatedly performed. By performing such control, outflow of $NO_X$ from the upstream side exhaust purification catalyst 20 can be prevented.

Note that, the control of the air-fuel ratio which is performed at the time of normal operation, is not necessarily limited to control such as explained above, which is based on the outputs of the upstream side air-fuel ratio sensor 40 and downstream side air-fuel ratio sensor 41. So long as control based on the outputs of these air-fuel ratio sensors 40, 41, it may be any control.

<Fuel Cut Control>

Further, in the internal combustion engine of the present embodiment, at the time of deceleration of the vehicle mounting the internal combustion engine, etc., fuel cut control is performed for stopping or greatly decreasing the injection of fuel from a fuel injector 11 during operation of the internal combustion engine to stop or greatly reduce the feed of fuel into a combustion chamber 5. This fuel cut control is started when a predetermined condition for start of fuel cut stands. Specifically, fuel cut control is, for example, performed when the amount of depression of the accelerator pedal 42 is zero or substantially zero (that is, engine load is zero or substantially zero) and the engine speed is equal to or greater than a predetermined speed higher than the speed at the time of idling.

When fuel cut control is performed, air or exhaust gas similar to air is exhausted from the internal combustion engine, and therefore gas with an extremely-high air-fuel ratio (that is, extremely high lean degree) flows into the upstream side exhaust purification catalyst 20. As a result, during fuel cut control, a large amount of oxygen flows into the upstream side exhaust, purification catalyst 20, and the oxygen storage amount of the upstream side exhaust purification catalyst 20 reaches the maximum storable oxygen amount.

Further, the fuel cut control is made to end if a predetermined condition for ending the fuel cut stands. As the condition for ending the fuel cut, for example, the amount of depression of the accelerator pedal 42 becoming a predetermined value or more (that is, the engine load becoming a certain extent of value) or the engine speed becoming equal to or less than a predetermined speed higher than the speed at the time of idling, etc., may be mentioned. Further, in the internal combustion engine of the present embodiment, right after the end of the fuel cut control, post-return rich control is performed which makes the air-fuel ratio of the exhaust gas flowing into the upstream side exhaust purification catalyst 20 a post-return rich air-fuel ratio which is richer than the rich set air-fuel ratio. Due to this, it is possible to quickly release the oxygen which is stored in the upstream side exhaust purification catalyst 20 during fuel cut control.

<Diagnosis of Abnormality of Air-Fuel Ratio Sensor>

In this regard, as explained above, the air-fuel ratio sensors 40, 41 deteriorate along with their use, and thus sometimes the air-fuel ratio sensors 40, 41 become abnormal. If the air-fuel ratio sensors 40, 41 become abnormal in this way, the precision of output deteriorates, and thus the amount of fuel injection from a fuel injector 11 can no longer be suitably controlled. As a result, deterioration of the exhaust emission or deterioration of the fuel economy is invited. Therefore, the internal combustion engine of the present embodiment is provided with an abnormality diagnosis system which self-diagnoses abnormality of the air-fuel ratio sensors 40, 41.

As the abnormality diagnosis control performed by such an abnormality diagnosis system, for example, performance at the time of fuel cut control may be mentioned. Specifically, abnormality of the responses of the air-fuel ratio sensors 40, 41 is diagnosed based on the changes in the output currents If, Ir of the air-fuel ratio sensors 40, 41 during performance of fuel cut control (in particular, right after start) and after the end of fuel cut control (in particular, right after end).

Figure 6:
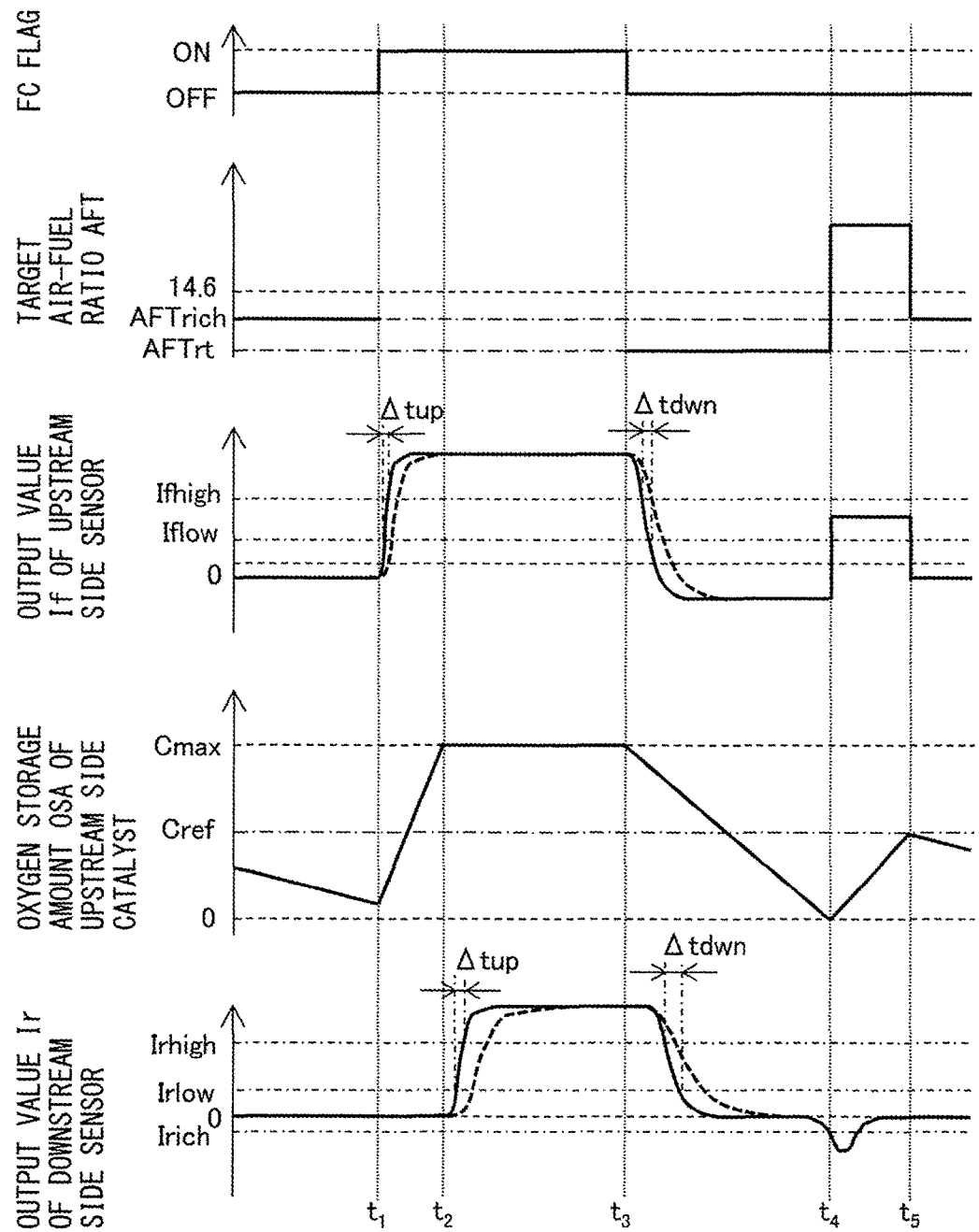
FIG. 6 is a time chart of a target air-fuel ratio, etc., at the time of fuel cut control.

FIG. 6 is a time chart of the target air-fuel ratio AFT, the output current If of the upstream side air-fuel ratio sensor 40, the oxygen storage amount OSA of the upstream side exhaust purification catalyst 20, and the output current Ir of the downstream side air-fuel ratio sensor 41, when performing fuel cut control. In the illustrated example, at the time $t_1$, fuel cut control is started (FC flag on), while at the time t, fuel cut control is ended (FC flag off).

In the illustrated example, before fuel cut control is started at the time $t_1$, air-fuel ratio control is performed at the time of the above-mentioned normal operation. If fuel cut control is started at the time $t_1$, gas with a lean air-fuel ratio with a large lean degree is exhausted from the engine body 1 and thereby the output current If of the upstream side air-fuel ratio sensor 40 rapidly rises. At this time, the oxygen in the exhaust gas flowing into the upstream side exhaust purification catalyst 20 is stored in the upstream side exhaust purification catalyst 20, and therefore the oxygen storage amount of the upstream side exhaust purification catalyst 20 increases. On the other hand, the output current Ir of the downstream side air-fuel ratio sensor 41 remains substantially zero (corresponding to stoichiometric air-fuel ratio).

Then, if at the time $t_2$ the oxygen storage amount of the upstream side exhaust purification catalyst 20 reaches the maximum storable oxygen amount (Cmax), it is no longer possible for the upstream side exhaust purification catalyst 20 to store more oxygen than that. Therefore, after the time $t_2$, the output current Ir of the downstream side air-fuel ratio sensor 41 rapidly rises.

If at the time $t_3$ the fuel cut control is ended, post-return rich control is performed to release the oxygen which has been stored in the upstream side exhaust purification catalyst 20 during fuel cut control. In post-return rich control, the target air-fuel ratio of the exhaust gas flowing into the upstream side exhaust purification catalyst 20 is set to a post-return rich air-fuel ratio AFTrt which is richer than the rich set air-fuel ratio AFTrich. Accordingly, the output current If of the upstream, side air-fuel ratio sensor 40 becomes a value smaller than zero (corresponding to rich air-fuel ratio) and the oxygen storage amount OSA of the upstream side exhaust purification catalyst 20 gradually decreases. At this time, even if exhaust gas of a rich air-fuel ratio flows into the upstream side exhaust purification catalyst 20, the oxygen stored in the upstream side exhaust purification catalyst 20 and the unburned gas in the exhaust gas react, and therefore the air-fuel ratio of the exhaust gas exhausted from the upstream side exhaust purification catalyst 20 becomes substantially the stoichiometric air-fuel ratio. Therefore, the output current If of the downstream side air-fuel ratio sensor 41 converges to substantially zero.

If the oxygen storage amount continues decreasing, finally the oxygen storage amount becomes substantially zero, and unburned gas flows out from the upstream side exhaust purification catalyst 20. Due to this, at the time $t_4$, the output current Ir of the downstream side air-fuel ratio sensor 41 becomes equal to or less than the rich judgment reference value Irich. If, in this way, the output current Ir of the downstream side air-fuel ratio sensor 41 reaches a value equal to or less than the rich judgment reference value Irich, the post-return rich control is ended. Then, the air-fuel ratio control at the above-mentioned normal operation is started. In the illustrated example, the air-fuel ratio of the exhaust gas flowing into the upstream side exhaust purification catalyst 20 is controlled so that the rich air-fuel ratio and the lean air-fuel ratio are alternately set.

When the air-fuel ratio sensors 40, 41 have not become abnormal with deterioration in response, if performing fuel cut control in this way, the output currents If, Ir of these air-fuel ratio sensors 40, 41 change as shown by the solid lines in the figure. That is, the output, current If of the upstream side air-fuel ratio sensor 40 rapidly changes from a value smaller than zero (corresponding to rich air-fuel ratio) to a value larger than zero (corresponding to lean air-fuel ratio) along with the start of fuel cut control. On the other hand, the output current Ir of the downstream side air-fuel ratio sensor 41 rapidly changes from substantially zero to a value larger than zero after somewhat of a time interval from the start of fuel cut control.

Further, the output current If of the upstream side air-fuel ratio sensor 40 rapidly changes from a value larger than zero to a value smaller than zero along with the end of fuel cut control. On the other hand, the output current Ir of the downstream side air-fuel ratio sensor 41 rapidly changes from a value larger than zero to substantially zero after somewhat of a time interval from the end of fuel cut control.

On the other hand, when the downstream side air-fuel ratio sensor 41 becomes abnormal, in particular, when it becomes abnormal with a drop in speed of response, if fuel cut control is performed, the output currents If, Ir of these air-fuel ratio sensors 40, 41 change as shown by the broken lines in the figure. That is, the speeds, at which the output currents If, Ir of the air-fuel ratio sensors 40, 41 rise when the fuel cut control is started, is not that fast. Similarly, the speeds, at which the output currents If, Ir of the air-fuel ratio sensors 40, 41 fall when the fuel cut control is ended, is also not that fast. That is, when the air-fuel ratio sensor 40, 41 have become abnormal with deterioration in response, the speeds of rise and speeds of fall of the output currents If, Ir of the air-fuel ratio sensors 40, 41 after the start and after the end of fuel cut control, become slower compared with when they have not become abnormal.

Therefore, in the present embodiment, after the start of fuel cut control, the time Δtup which is taken for the output currents If, Ir of the air-fuel ratio sensors 40, 41 to change from the low reference values Iflow, Irlow (for example, corresponding to the air-fuel ratio of 15.5) to the high reference value Ifhigh, Irhigh (for example, corresponding to air-fuel ratio of 18) (below, referred to as "rising time"), is calculated. When the thus calculated rising time Δtup is shorter than the predetermined abnormality judgment reference rising time tupref, it is judged that the air-fuel ratio sensors 40, 41 have not become abnormal. On the other hand, when the thus calculated rising time Δtup is equal to or greater than a predetermined abnormality judgment reference rising time tupref, it is judged that the air-fuel ratio sensors 40, 41 have become abnormal.

Similarly, in the present embodiment, after the end of fuel cut control, the time Δtdwn taken for the output currents If, Ir of the air-fuel ratio sensors 40, 41 change from the high reference values Ifhigh, Irhigh to the low reference values Iflow, Irlow (below, referred to as the "falling time"), is calculated. When the thus calculated falling time Δtdwn is shorter than the predetermined abnormality judgment reference falling time, it is judged that the air-fuel ratio sensors 40, 41 have not become abnormal. On the other hand, when the thus calculated falling time Δtdwn is equal to or greater than a predetermined abnormality judgment reference falling time, it is judged that the air-fuel ratio sensors 40, 41 have become abnormal. Note that, in the following explanation, the above-mentioned "rising time" and "falling time" will be expressed together as the "response time".

When it is judged as a result of such abnormality diagnosis that the downstream side air-fuel ratio sensor 41 has become abnormal, for example, an alarm light may be turned on to notify the user that the downstream side air-fuel ratio sensor 41 is abnormal.

Note that, in the above-mentioned example, the response time is used as the parameter which shows the responses of the air-fuel ratio sensors 40, 41 to diagnose abnormality of the air-fuel ratio sensors 40, 41. However, it is also possible to use a parameter other than the response time as the parameter which shows the responses of the air-fuel ratio sensors 40, 41. As such a parameter, for example, the rate of change with time (amount of change of output current per unit time) while the output currents of the air-fuel ratio sensors 40, 41 change from the low reference value to the high reference value in the time period during which the output values of the air-fuel ratio sensors 40, 41 change along with start of fuel cut control, the rate of change with time while the output currents of the air-fuel ratio sensors 40, 41 change from the high reference value to the low reference value in the time period during which the output values of the air-fuel ratio sensors 40, 41 change along with the end of fuel cut control, etc., may be mentioned. In this case, when the rate of change with time is larger than a predetermined abnormality judgment reference rate of change, it is judged that the air-fuel ratio sensors 40, 41 are not abnormal. On the other hand, when the rate of change with time is equal to or less than a predetermined abnormality judgment, reference rate of change, it is judged that the air-fuel ratio sensors 40, 41 have become abnormal. Therefore, in the present embodiment, it can be said that the value of the parameter which shows the responses of the air-fuel ratio sensors 40, 41 is compared with a predetermined abnormality judgment threshold value (abnormality judgment reference response time, abnormality judgment reference rate of change, etc.) to diagnose abnormality relating to the responses of the air-fuel ratio sensors 40, 41.

<Problems in Abnormality Diagnosis>

In this regard, the above-mentioned response time or rate of change with time changes not only in accordance with the deterioration in responses of the air-fuel ratio sensors 40, 41, but also other factors, specifically, the output gains of the air-fuel ratio sensors 40, 41. The output gains express the ratios of change of the magnitude of the output currents with respect to the change of the air-fuel ratio of the exhaust gas flowing around the air-fuel ratio sensors 40, 41. Therefore, if the output gains are large, the absolute values of the output currents become larger, even if the deviations of the air-fuel ratios of the exhaust gas flowing around the air-fuel ratio sensors 40, 41 from the stoichiometric air-fuel ratio are the same.

The output gains of the air-fuel ratio sensors 40, 41 change due to various factors. For example, if the pressure of the exhaust gas around the air-fuel ratio sensors 40, 41 becomes higher or the areas of the electrodes 52, 53 of the air-fuel ratio sensors 40, 41 become larger, the output gains become smaller. Further, the longer the diffusion distances of the diffusion regulation layers 54 of the air-fuel ratio sensors 40, 41 (corresponding to thicknesses of diffusion regulation layers), the smaller the output gains.

Figure 7A:
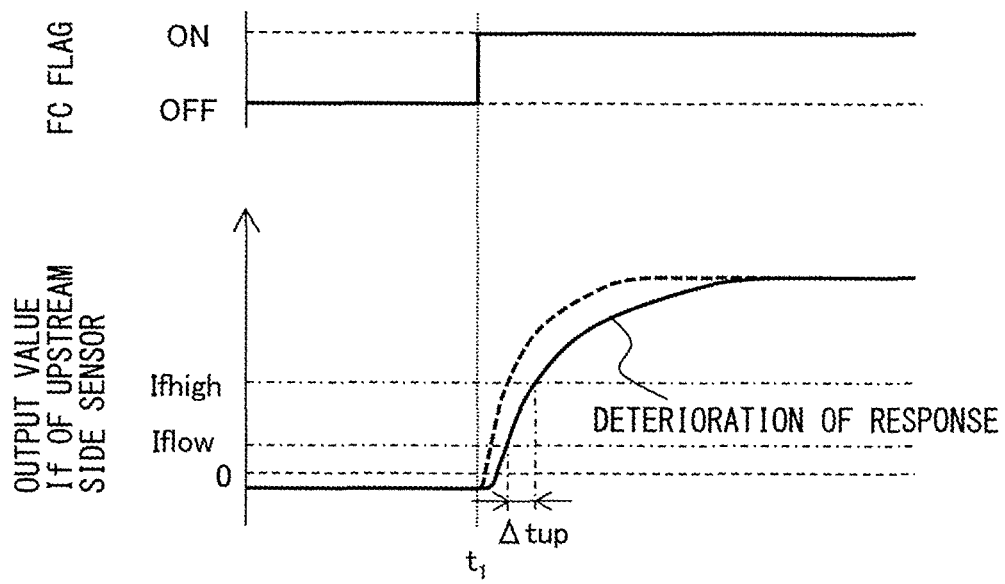
FIGS. 7A and 7B are time charts of an output current of an upstream side air-fuel ratio sensor at the time of start of fuel cut control.
Figure 7B:
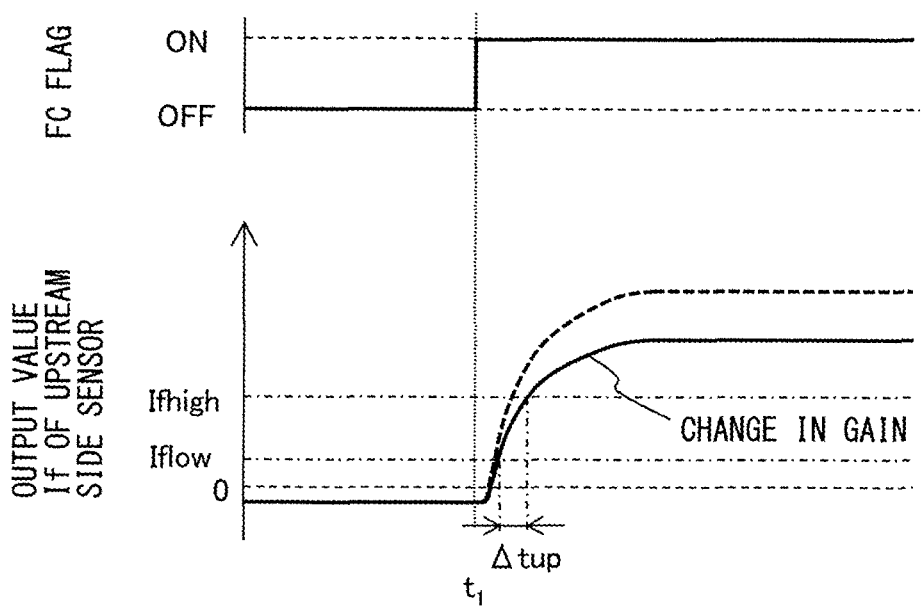

FIGS. 7A and 7B are time charts of the output current If of the upstream side air-fuel ratio sensor 40 at the time of start of fuel cut control, In these figures, FIG. 7A is a time chart in the case of deterioration in responses at the air-fuel ratio sensors 40, 41, while FIG. 7B is a time chart in the case of a drop in the output gain. The broken lines in the figures show the case when deterioration in responses or a drop in the output gains does not occur in the air-fuel ratio sensors 40, 41. Note that, in the example shown in FIGS. 7A and 7B, fuel cut control is started at the time $t_1$.

As shown in FIG. 7A, when the upstream side air-fuel ratio sensor 40 deteriorates in response (solid line), the speed of rise of the output current If becomes slower over the entire rising period, compared with when it does not deteriorate in response (broken line). As a result, if the upstream side air-fuel ratio sensor 40 deteriorates in response, the rising time Δtup becomes longer, compared with when it does not deteriorate in response.

On the other hand, as shown in FIG. 7B, when the output gain falls, the converged value, at which the output current If of the upstream side air-fuel ratio sensor 40 finally converges, changes during fuel cut control. In the example shown by the solid line in FIG. 7B, as a result of a drop in the output gain, the converged value of the output current If becomes smaller, compared with when the output gain does not drop. On the other hand, even If the output gain falls in this way, the output current If of the upstream side air-fuel ratio sensor 40 does not change in timing of final convergence. As a result, if the output gain falls, along with this, the rising time Δtup taken for the output current If of the upstream side air-fuel ratio sensor 40 to change from the low reference value Iflow to the high reference value Ifhigh, becomes longer. Conversely, if the output gain rises, the rising time Δtup becomes shorter.

In this way, both in the case where the upstream side air-fuel ratio sensor 40 deteriorates in response and in the case where the output gain falls, the rising time Δtup becomes longer, compared with when the sensor does not deteriorate in response or when the output gain does not fall. Therefore, when the rising time Δtup becomes longer, it is not possible to identify if the upstream side air-fuel ratio sensor 40 is deteriorating in response or if the output, gain is falling. Therefore, even if the upstream side air-fuel ratio sensor 40 does not actually deteriorate in response and only the output gain falls, the rising time Δtup becomes longer and it is judged that the abnormality of deterioration in response has occurred.

Note that, in FIGS. 7A and 7B, the explanation was given with reference to the example of the rising time Δtup at the output current If of the upstream side air-fuel ratio sensor 40. However, such a phenomenon, that is, the phenomenon that a change similar to the change occurring in the case of deterioration in response occurs due to a drop in the output gain, occurs even in the falling time Δtdown or rate of change with time at the output current If of the upstream side air-fuel ratio sensor 40. Further, such a phenomenon occurs not only at the upstream side air-fuel ratio sensor 40, but also at the downstream side air-fuel ratio sensor 41.

<Abnormality Diagnosis in Present Invention>

In this regard, as will be understood from FIGS. 7A and 7B, when the air-fuel ratio sensors 40, 41 deteriorate in response, the rising time Δtup, etc., change, but the values, at which the output currents of the air-fuel ratio sensors 40, 41 converge during fuel cut control, do not change. On the other hand, when the output gains of the air-fuel ratio sensors 40, 41 change, not only the rising time Δtup, etc., but also the values at which the output currents of the air-fuel ratio sensors 40, 41 converge during fuel cut control change. Therefore, in the present embodiment, the converged values at which the output currents of the air-fuel ratio sensors 40, 41 converge during fuel cut control are used as the basis to correct the rising time Δtup etc. Further, the thus corrected rising time Δtup' etc. are used as the basis for abnormality diagnosis of the air-fuel ratio sensors 40, 41.

Below, the case of correcting the rising time Δtup of the upstream side air-fuel ratio sensor 40 will be specifically explained as an example. First, as explained referring to FIG. 6, the time taken for the output current If of the upstream side air-fuel ratio sensor 40 after the start of fuel cut control to change from the low reference value Iflow to the high reference value Ifhigh, that is, the rising time Δtup, is calculated. Then, if the output current If of the upstream side air-fuel ratio sensor 40 converges to a constant value, the value at that time is detected as a converged value Ifcon.

Figure 8:
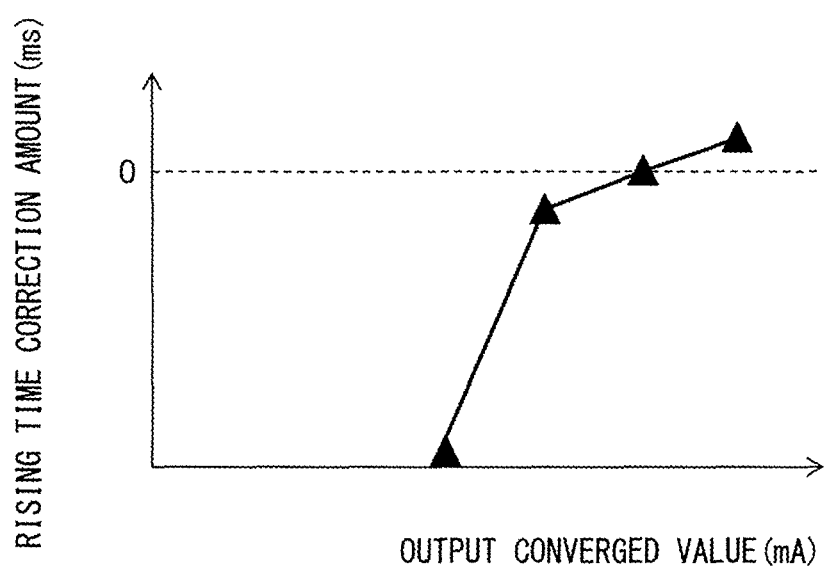
FIG. 8 is a view which shows the relationship between an output converged value and a correction amount of a rising time.

FIG. 8 is a view which shows the relationship between the converged value (below, referred to as the "output converged value") Ifcon at which the output current If of the upstream side air-fuel ratio sensor 40 converges and the correction amount M of the rising time (response time). As will be understood from FIG. 8, the larger the output converged value Ifcon becomes, the more the correction amount M of the rising time is increased. In particular, in the example shown in FIG. 8, when the output converged value Ifcon is larger than a certain predetermined value, the correction amount M of the rising time is set to a value larger than 0. On the other-hand, when the output converged value Ifcon is smaller than a certain predetermined value, the correction amount of the rising time is set to a value smaller than 0.

Further, using the map such as shown in FIG. 8, the correction amount M of the rising time is calculated based on the output converged value Ifcon of the upstream side air-fuel ratio sensor 40 which is detected as explained above. Then, the thus calculated correction amount M of the rising time was added to the value of the rising time Δtup which was calculated as explained above, to calculate the corrected rising time Δtup'. Therefore, when the output converged value Ifcon is larger than a certain predetermined value, the corrected rising time Δtup' is longer than the actually detected rising time Δtup. On the other hand, when the output converged value Ifcon is smaller than a certain predetermined value, the corrected rising time Δtup' is shorter than the actually detected rising time Δtup.

Further, the thus calculated corrected rising time Δtup' is compared with the abnormality judgment reference rising time tupref. If, as a result, of the comparison, the corrected rising time Δtup' is shorter than the abnormality judgment reference rising time tupref, it is judged that the upstream side air-fuel ratio sensor 40 has not become abnormal. On the other hand, if, as a result of the comparison, the corrected rising time Δtup' is equal to or greater than the abnormality judgment reference rising time tupref, it is judged that the upstream side air-fuel ratio sensor 40 has become abnormal.

Figure 9A:
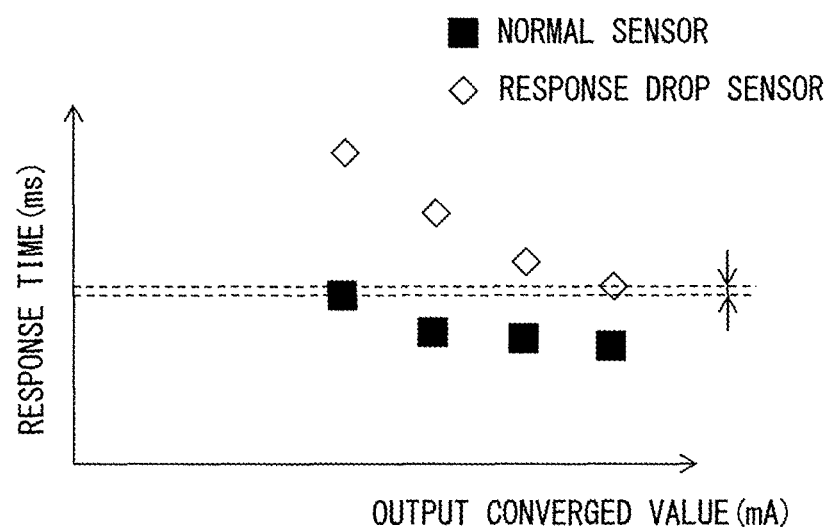
FIGS. 9A and 9B are views which show the relationship between an output converged values of a normal air-fuel ratio sensor and an air-fuel ratio sensor at which the response falls and a response time.
Figure 9B:
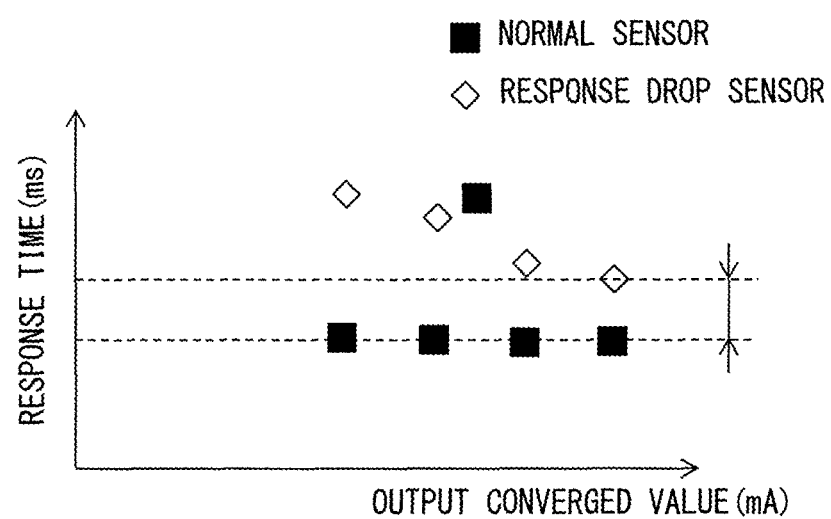

FIGS. 9A and 9B are views which show the relationship between the output converged value and response time of a normal air-fuel ratio sensor and an air-fuel ratio sensor whose response falls. FIG. 9A shows the case of not correcting the response time as explained above, while FIG. 9B shows the case of correcting the response time as explained above. When not correcting the response time as explained above, as shown in FIG. 9A, it is learned that even when the air-fuel ratio sensor is normal, the response time changes in accordance with the output converged value. As a result, the response time when the air-fuel ratio sensor is normal and the output converged value is small becomes almost the same as the response time when the response of the air-fuel ratio sensor falls and the output converged value is large. Therefore, it is not possible to accurately detect a drop in the response of the air-fuel ratio sensor, On the other hand, when correcting the above-mentioned response time, as shown in FIG. 9B, when the air-fuel ratio sensor is normal, even when the output converged value changes, the response time does not change much at all. As a result, there is a difference between the response time which can be taken when the air-fuel ratio sensor is normal and the response time which can be taken when the response of the air-fuel ratio sensor falls. Therefore, it is possible to accurately detect a drop in response of the air-fuel ratio sensor. That is, according to the present embodiment, even if the converged value of output of the air-fuel ratio sensor changes, that is, even if the output gain of the air-fuel ratio sensor changes, it is possible to accurately diagnose the abnormality of deterioration in response of the air-fuel ratio sensor.

Note that, in the present embodiment, the output converged value Ifcon of the upstream side air-fuel ratio sensor 40 is calculated as follows: First, convergence of the output current If of the upstream side air-fuel ratio sensor 40 is judged. Convergence of the output current If is judged, for example, based on whether the elapsed time from the start of fuel cut control is equal to or greater than a predetermined convergence judgment reference time. When the elapsed time is equal to or greater than the convergence judgment reference time, it is judged that the output current If has converged. This convergence judgment reference time is, for example, set to a maximum value of the time which is normally taken from when fuel cut control is started to when the output current If of the upstream side air-fuel ratio sensor 40 converges, or a time which slightly differs from this maximum value. Alternatively, convergence of the output current If may be judged based on whether the amount of change per unit time of the output current If is equal to or less than the convergence judgment reference amount. In this case, it is judged that the output current If has converged when the amount is equal to or less than the convergence judgment reference amount.

Further, the output current If of the upstream side air-fuel ratio sensor 40 is detected over the measurement period from when it is judged that the output current If of the upstream side air-fuel ratio sensor 40 has converged in this way to when a predetermined time elapses therefrom. Further, the average value of the output current of the upstream side air-fuel ratio sensor 40 at the measurement period is used as the output converged value Ifcon.

Further, the output converged value Ircon of the downstream side air-fuel ratio sensor 41 is similarly calculated. However, convergence of the downstream side air-fuel ratio sensor 41 is judged based on the elapsed time from when it, is estimated the cumulative amount of intake air which was fed into a combustion chamber 4 after the start of fuel cut. control reaches a reference cumulative amount, rather than the elapsed time from when the fuel cut control is started. Alternatively, this is judged based on the elapsed time from, when the output current of the downstream side air-fuel ratio sensor 41 becomes a lean judgment reference value which is larger than zero after the start of fuel cut control. Convergence is judged in this way since by the upstream side exhaust purification catalyst 20 storing oxygen, the rise in the output current of the air-fuel ratio sensor 41 becomes delayed after the start of fuel cut control. Note that, the predetermined reference cumulative amount is equal to or greater than an amount of air in which is contained an amount of oxygen corresponding to the maximum storable oxygen amount Cmax at the time of non-use of the upstream side exhaust purification catalyst 20. Further, the lean judgment reference value Irlean is a value which corresponds to a predetermined lean judged air-fuel ratio (for example, 14.65) which is slightly leaner than the stoichiometric air-fuel ratio.

Alternatively, convergence of the downstream side air-fuel ratio sensor 41 is judged based on the amount of change per unit time of the output current If after it is estimated that the oxygen storage amount of the upstream side exhaust purification catalyst has reached the maximum storable oxygen amount. Alternatively, it is performed based on the amount of change per unit time of the output current If after the output current of the downstream side air-fuel ratio sensor 41 becomes equal to or greater than the lean judgment reference value after the start of fuel cut control, Note that, in the above embodiment, as shown in FIG. 8, the correction amount M of the rising time is calculated based on the output converged value Ifcon. However, a correction rate of the rising time may also be calculated based on the output converged value Ifcon. In this case, the thus calculated correction rate is multiplied with the actually detected rising time Δtup to calculate a corrected rate of rise Δtup'. Further, the correction rate increases the larger the output converged value Ifcon becomes.

Further, in the above-mentioned example, the rising time Δtup at the upstream side air-fuel ratio sensor 40 was used as an example, but it is possible to correct the rising time Δtup at the downstream side air-fuel ratio sensor 41 and the falling time Δtdwn at the two air-fuel ratio sensors 40, 41 as well, based on the output converged values of the air-fuel ratio sensors 40, 41.

<Flow Chart>

Figure 10:
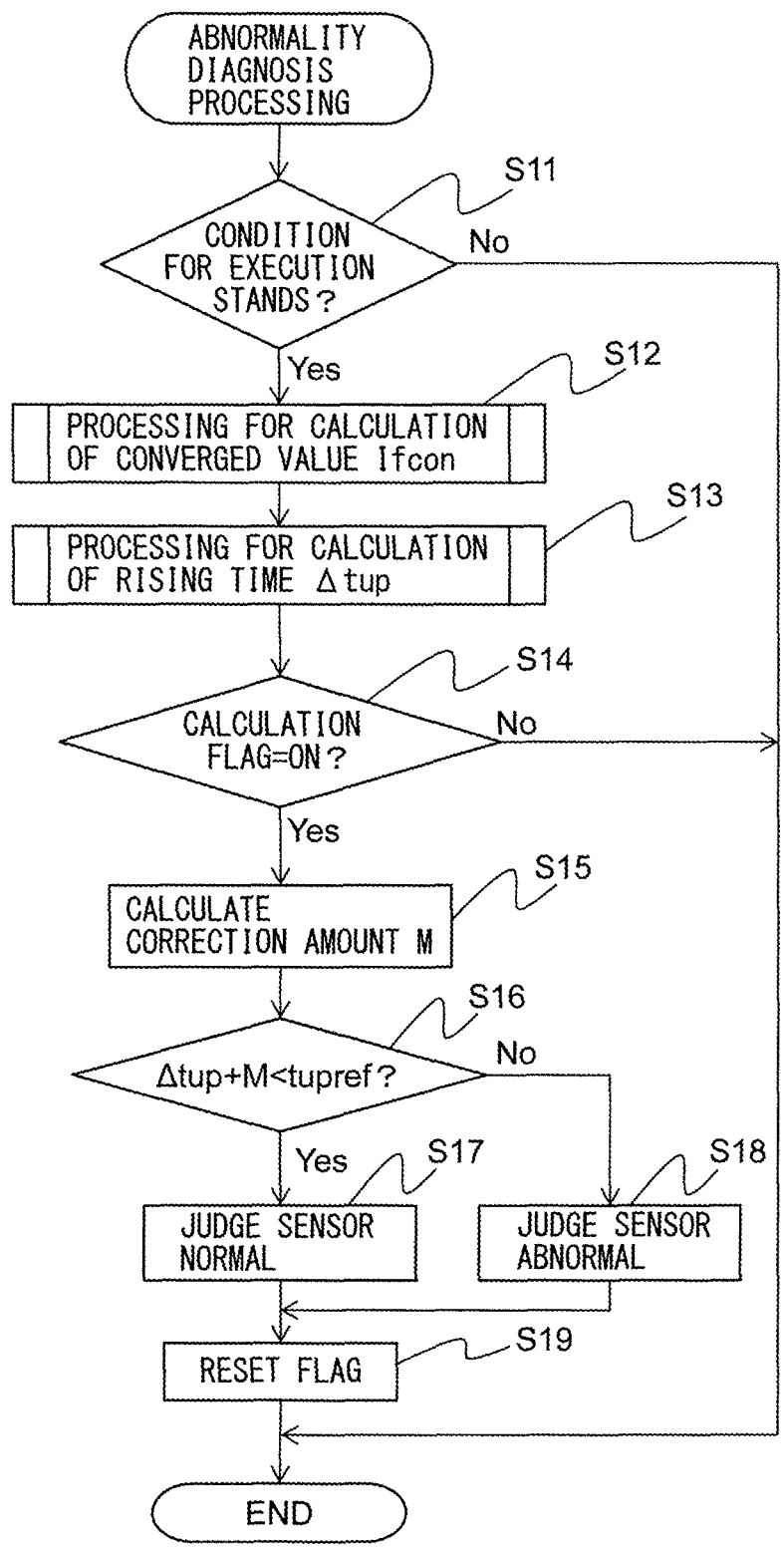
FIG. 10 is a flow chart which shows a control routine of abnormality diagnosis processing of an upstream side air-fuel ratio sensor, which is performed in an abnormality diagnosis system of the present embodiment.

FIG. 10 is a flow chart which shows a control routine of abnormality diagnosis processing of the upstream side air-fuel ratio sensor 40 which is performed by the abnormality diagnosis system of the present embodiment. The illustrated control routine is performed by interruption at constant time intervals.

In the example shown in FIG. 10, first, at step S11, it is judged if the condition for performing the abnormality diagnosis processing stands. The condition for performing the abnormality diagnosis processing stands, for example, in the case where at least part of the following conditions, preferably all, are satisfied:

Temperature of engine cooling water which is detected by temperature sensor (not shown) detecting the temperature of the engine cooling water is equal to or greater than predetermined temperature.

Elapsed rime from end of previous fuel cut control is equal to or greater than predetermined time.

Elapsed time from end of fuel increasing control which temporarily increases the amount of fuel injection at the time of engine high load operation, etc., is equal to or greater than predetermined time.

Abnormality diagnosis relating to response of upstream side air-fuel ratio sensor 40 has still not ended.

Figure 11:
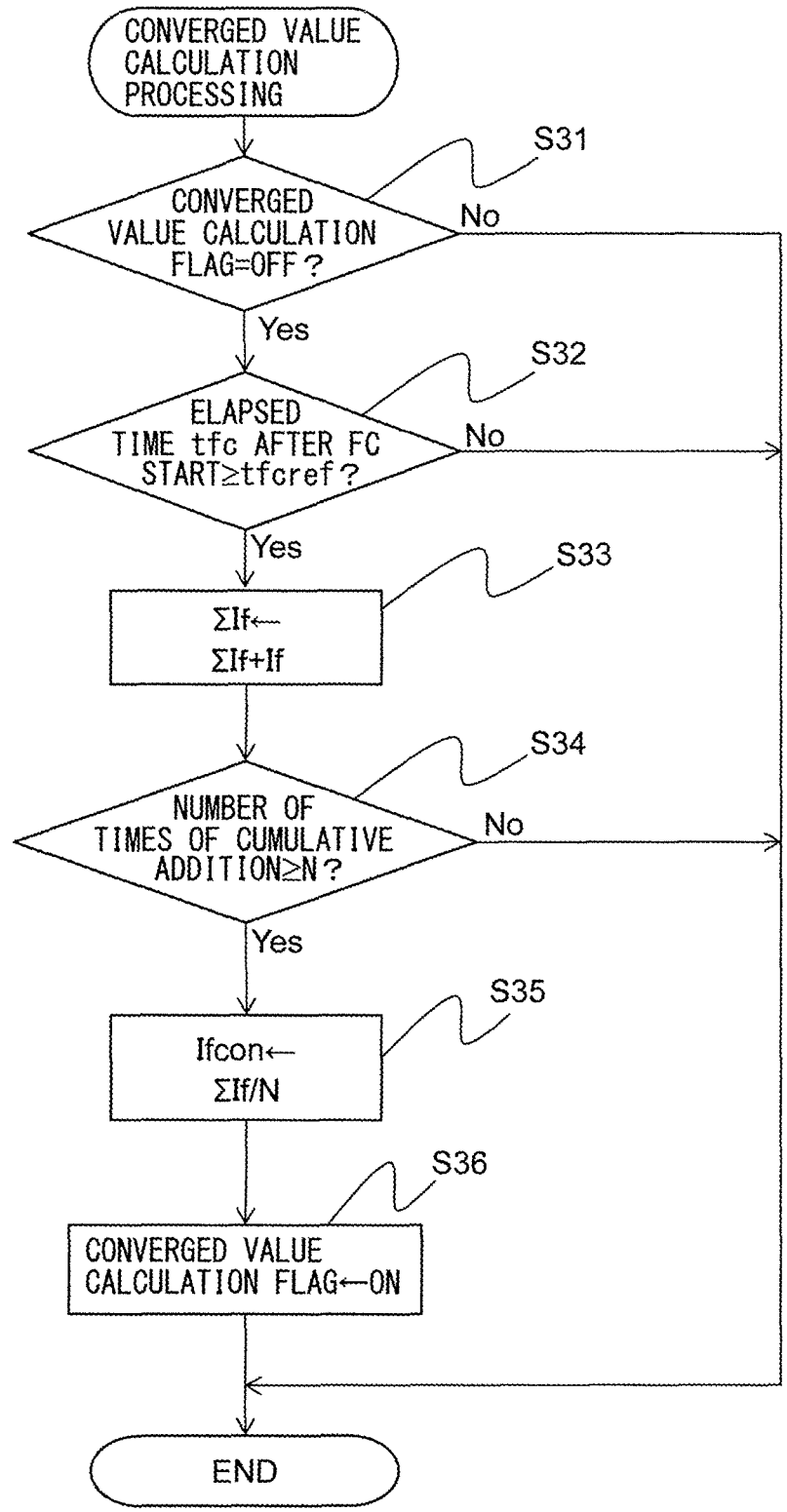
FIG. 11 is a flow chart which shows a control routine of processing for calculating an output converged value.
Figure 12:
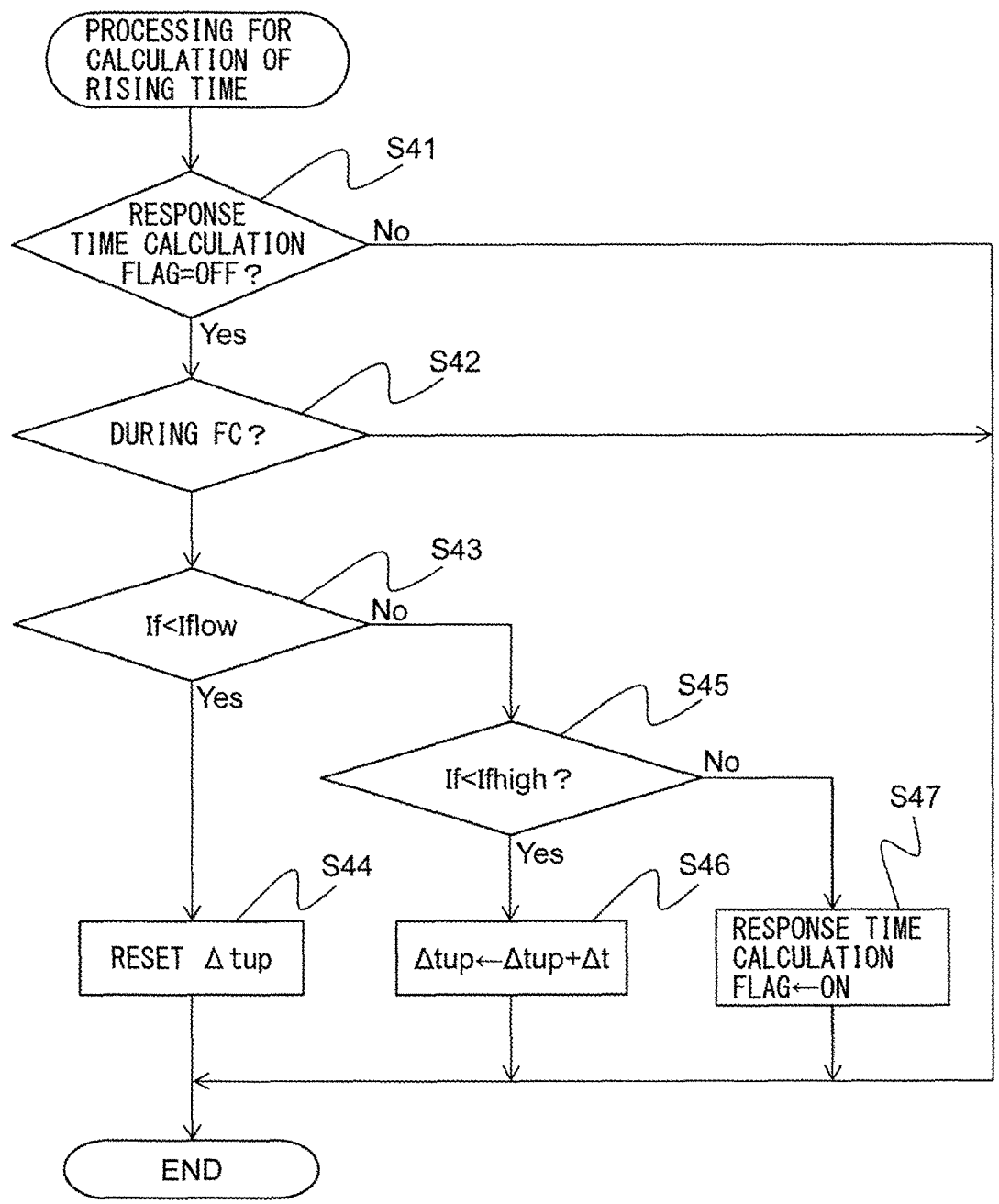
FIG. 12 is a flow chart which shows a control routine of processing for calculating a rising time.

If it is judged at step S11 that the condition for performing the abnormality diagnosis processing does not stand, for example, if the temperature of the engine cooling water which is detected by a temperature sensor (not shown) is less than a predetermined temperature, the control routine is ended. On the other hand, if it is judged at step S11 that the condition for performing the abnormality diagnosis processing stands, the routine proceeds to step S12. At step S12, the processing for calculation of the output converged value Ifcon, which is shown in FIG. 11, is performed. Next, at step S13, the processing for calculation of the rising time Δtup, which is shown in FIG. 12, is performed.

Then, at step S14, it is judged if the converged value calculation flag and rising time calculation flag are ON. The converged value calculation flag is a flag which is set ON when the output converged value Ifcon finishes being calculated and is set OFF before that. Further, the rising time calculation flag is a flag which is set ON if the rising time Δtup finishes being calculated and is set OFF before that. If, at step S14, it is judged that at least one of the converged value calculation flag and rising time calculation flag is OFF, sufficient data for abnormality diagnosis of the upstream side air-fuel ratio sensor 40 is not collected, and therefore the control routine is ended.

On the other hand, if, at step S14, it is judged that the converged value calculation flag and rising time calculation flag are ON, the routine proceeds to step S15. At step S15, the correction amount M is calculated by using a map such as shown in FIG. 8, based on the output converged value Ifcon calculated at step S12. Next, at step S16, it is judged if the value (Δtup+M) obtained by adding the correction amount M calculated at step S15 to the rising time Δtup calculated at step S13, that is, the corrected rising time Δtup', is shorter than the abnormality judgment reference rising time tupref. If it is judged that the corrected rising time Δtup' (=Δtup+M) is shorter than the abnormality judgment reference rising time tupref, the routine proceeds to step S17. At step S17, it is judged that the upstream side air-fuel ratio sensor 40 is normal and the routine proceeds to step S19. On the other hand, if it is judged at step S16 that the corrected rising time Δtup' is equal to or greater than the abnormality judgment reference rising time tupref, the routine proceeds to step S18. At step S18, it is judged that the upstream side air-fuel ratio sensor 40 has become abnormal, then the routine proceeds to step S19. At step S19, the converged value calculation flag and rising time calculation flag are reset to OFF and the control routine is ended.

FIG. 11 is a flow chart which shows a control routine of processing for calculation of the output converged value Ifcon. The control routine shown in FIG. 11 is performed at step S12 of FIG. 10.

As shown in FIG. 11, first, at step S31, it is judged if the converged value calculation flag is OFF, If the converged value calculation flag is ON, the converged value Ifcon has already finished being calculated, and therefore the control routine is ended. On the other hand, if it is judged at step S31 that the converged value calculation flag is OFF, the routine proceeds to step S32.

At step S32, it is judged if the elapsed time tfc from the start of the fuel cut control (FC) is equal to or greater than the convergence judgment reference time tfcref. This convergence judgment reference time tfcref is, for example, set to the maximum value of the time which is usually taken from the start of fuel cut control to when the output current of the upstream side air-fuel ratio sensor 40 converges or a time slightly different from this maximum value. If it is judged that the elapsed time tfc from the start of the fuel cut control is shorter than the convergence judgment reference time tref, the output current If of the upstream side air-fuel ratio sensor 40 has not converged, and therefore the control routine is ended. On the other hand, if it is judged that the elapsed time tfc from the start of the fuel cut control is equal to or greater than the convergence judgment reference time tref, the routine proceeds to step S33.

At step S33, the current output current If of the upstream, side air-fuel ratio sensor 40 is added to the value of the output current cumulative value ΣIf to calculate the new output current cumulative value ΣIf. Next, at step S34, it is judged if the number of times of cumulative addition of the output current If at step S33 is equal to or greater than N times, that is, if the elapsed time from when it is judged that the upstream side air-fuel ratio sensor 40 has converged is equal to or greater than a predetermined time. If it is judged that the number of times of cumulative addition of the output current If is smaller than N, it is not possible to calculate a suitable output converged value Ifcon, and therefore the control routine is ended. On the other hand, if it is judged that the number of times of cumulative addition of the output current If is equal to or greater than N times, the routine proceeds to step S35. At step S35, the cumulative value ΣIf of the output current is divided by the number of times N of cumulative addition to calculate the output converged value Ifcon. Next, at step S36, the converged value calculation flag is set to ON and the control routine is ended.

FIG. 12 is a flow chart which shows a control routine of processing for calculation of the rising time Δtup. The control routine shown in FIG. 12, is run at step S13 of FIG. 10.

As shown in FIG. 12, first, at step S41, it is judged if the rising time calculation flag is OFF. If the rising time calculation flag is ON, the rising time Δtup has already finished being calculated, and therefore the control routine is ended. On the other hand, if it is judged at step S41 that the rising time calculation flag is OFF, the routine proceeds to step S42.

At step S42, it is judged if the system is currently in the middle of fuel cut control (FC). If it is judged that the system is not in the middle of fuel cut control, the rising time cannot be calculated, and therefore the control routine is ended. Then, if the fuel cut control is started, at step S42, it is judged that the system is currently in the middle of fuel cut control and the routine proceeds to step S43. At step S43, it is judged if the output current If of the upstream side air-fuel ratio sensor 40 is lower than the low reference value Iflow.

If it is judged at step S43 that the output current If of the upstream side air-fuel ratio sensor 40 is lower than the low reference value Iflow, the routine proceeds to step S44. At step S44, the response time Δtup is reset to zero and the control routine is ended. On the other hand, if time has elapsed from the start of fuel cut control and the output current If of the upstream side air-fuel ratio sensor 40 rises along with the rise of the exhaust air-fuel ratio, at the next control routine, at step S43, it is judged that the output current If is equal to or greater than the low reference value Iflow and the routine proceeds to step S45.

At step S45, it is judged if the output current If of the upstream side air-fuel ratio sensor 40 is smaller than the high reference value Ifhigh. If it is judged at step 345 that, the output current If is smaller than the high reference value Ifhigh, the routine proceeds to step S46. At step S46, a slight time At (corresponding to interval for performing control routine) is added to the value of the rising time Δtup to calculate a new rising time Δtup, and the control routine is ended. Then, if the output current If of the upstream side air-fuel ratio sensor 40 rises along with a further rise in the exhaust air-fuel ratio, at the next control routine, at step S45, it is judged that, the output current If is equal to or greater than the high reference value Ifhig and the routine proceeds to step S47. At step S47, the response time calculation flag is set ON and the control routine is ended.

Figure 13:
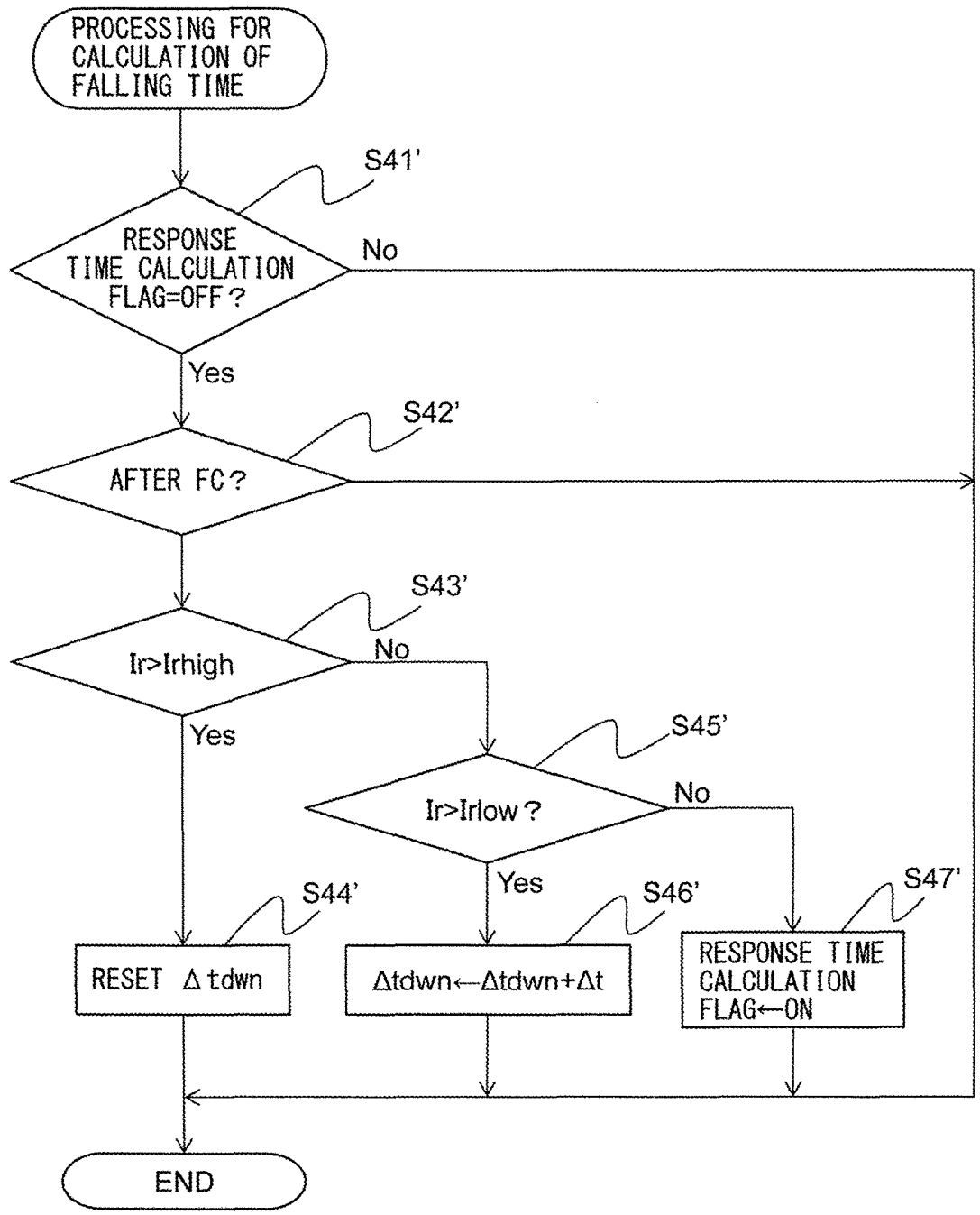
FIG. 13 is a flow chart which shows a control routine of processing for calculating a falling time.

Note that, in the above flow chart, the case is shown of diagnosing abnormality of the upstream side air-fuel ratio sensor 40 based on the rising time Δtup of the upstream side air-fuel ratio sensor 40. However, it is possible to diagnose abnormality of the upstream side air-fuel ratio sensor 40, based on the falling time Δtdwn of the upstream side air-fuel ratio sensor 40, by using a similar control routine. However, in this case, instead of the processing for calculating the rising time shown in FIG. 12, processing for calculating the falling time shown in FIG. 13 is performed (the step numbers of FIG. 13 are numbers of the corresponding steps at FIG. 12 with apostrophes). In the control routine step S42' of the processing for calculating the falling time which is shown in FIG. 13, it is judged if the present time is after the end of fuel cut control. Further, at step S43', it is judged if the output current Ir of the downstream side air-fuel ratio sensor 41 is higher than the high reference value Irhihg. In addition, at step S45', it is judged that the output current Ir of the downstream side air-fuel ratio sensor 41 is higher than the low reference value Irlow.

In addition, it is possible to use a similar control routine to diagnose abnormality of the downstream side air-fuel ratio sensor 41 based on the rising time Δtup or falling time Δtdwn of the downstream side air-fuel ratio sensor 41. In this case, instead of processing for calculating the converged value shown in FIG. 11, processing for calculating the converged value, which is shown in FIG. 14, is performed.

Figure 14:
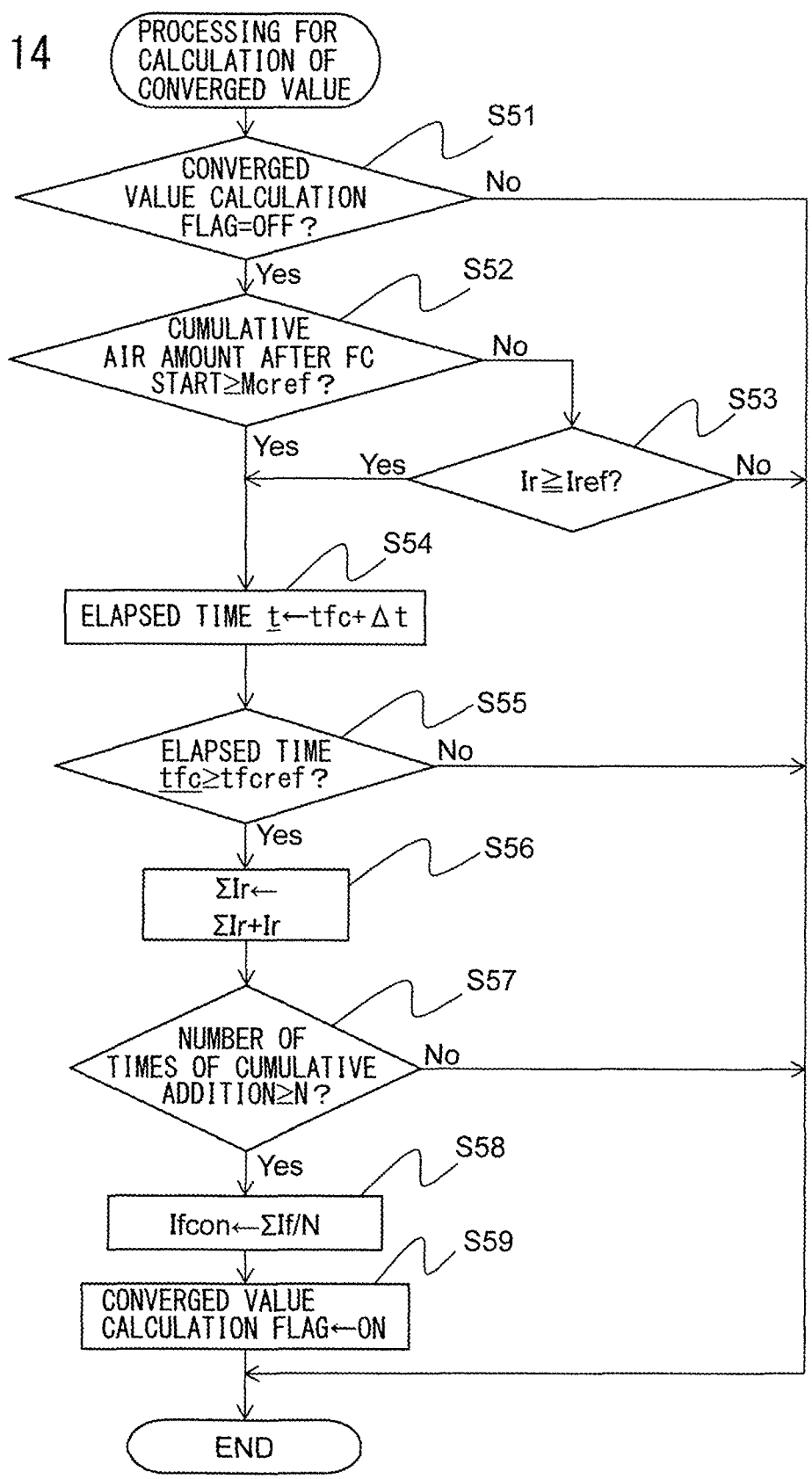
FIG. 14 is a flow chart which shows a control routine of processing for calculating an output converged value at a downstream side air-fuel ratio sensor.

FIG. 14 is a flow chart which shows the control routine of processing for calculation of the output converged value Ircon at the downstream side air-fuel ratio sensor 41. Note that, steps S56 to S59 at FIG. 14 are similar to steps S33 to S36 at FIG. 11, and therefore the explanations will be omitted.

As shown in FIG. 14, first, at step S51, it is judged if the converged value calculation flag is OFF, If it is judged that the converged value calculation flag is OFF, the routine proceeds to step S52. At step S52, it is judged if the cumulative value ΣMc of the amount of intake air (cumulative amount of air) which is fed to the combustion chamber 5 from when the fuel cut control is started, is equal to or greater than a predetermined reference cumulative amount Mcref. In addition, at step S53, it is judged if the output current Ir of the downstream side air-fuel ratio sensor 41 has become equal to or greater than a lean judgment reference value Irlean larger than zero.

At steps S52 and S53, when it is judged that the cumulative air amount ΣMc after the start of fuel cut control is smaller than the reference cumulative amount Mcref and the output current Ir of the downstream side air-fuel ratio sensor 41 is smaller than the lean judgment reference value Irlean, this means there is a possibility of the oxygen storage amount of the upstream side exhaust purification catalyst 20 has not reached the maximum storable oxygen amount Cmax. Therefore, the air-fuel ratio of the exhaust gas flowing out from the upstream side exhaust purification catalyst 20 is substantially the stoichiometric air-fuel ratio and the output current. Ir of the downstream side air-fuel ratio sensor 41 does not change much from zero. Therefore, in such a case, the rising time Δtup cannot be detected. Therefore, in such a case, the control routine is ended.

On the other hand, if at step S52 the cumulative air amount ΣMc after the start of fuel cut control is equal to or greater than the reference cumulative amount Mcref or at step S53 it is judged that the output current Ir of the downstream, side air-fuel ratio sensor 41 is equal to or greater than the lean judgment reference value Irlean, it means the oxygen storage amount of the upstream side exhaust purification catalyst 20 has reached the maximum storable oxygen amount Cmax. Therefore, the air-fuel ratio of the exhaust gas flowing out from the upstream, side exhaust, purification catalyst 20 gradually rises. Therefore, in such a case, the routine proceeds to step S54 where a slight time Δt (corresponding to interval of performing control routine) is added to the value of the elapsed time tfc to calculate a new elapsed time tfc, and measurement of the elapsed time is started. Then, the routine proceeds to step S55 where it is judged if the elapsed time tfc calculated at step S54 is equal to or greater than a predetermined convergence judgment reference time tfcref. If it is judged that the elapsed time tfc calculated at step S54 is shorter than the convergence judgment, reference time tfcref, the output current Ir of the downstream side air-fuel ratio sensor 41 has not converged, and therefore the control routine is ended. On the other hand, if it is judged that the elapsed time tfc calculated at step S54 is equal to or greater than the convergence judgment reference time tfcref, the routine proceeds to step S56.

<First Modification of First Embodiment>

Figure 15:
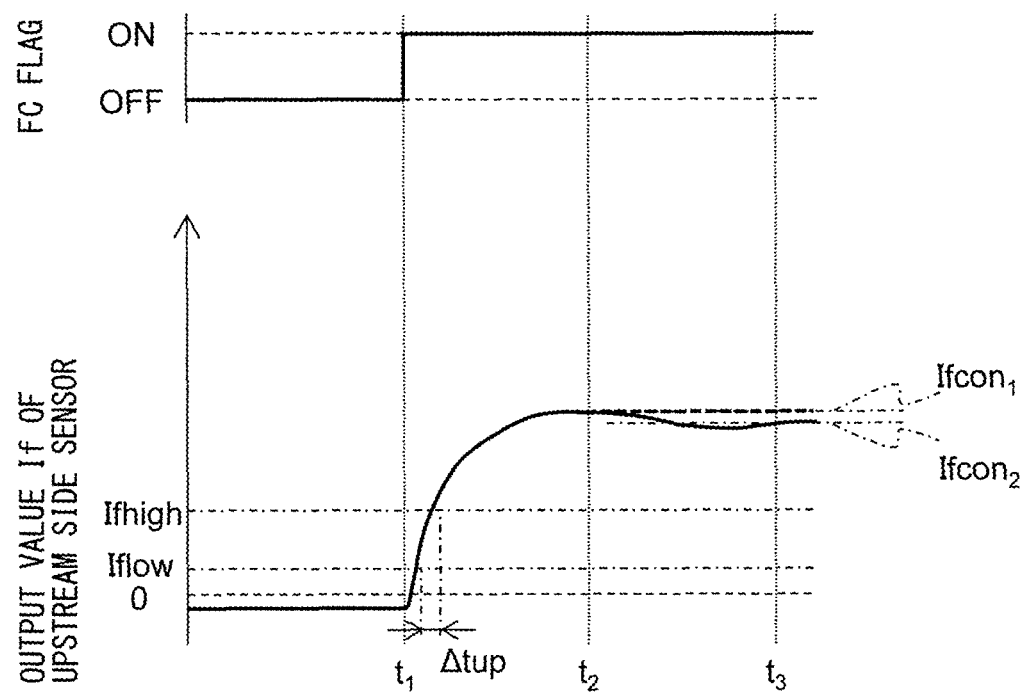
FIG. 15 is a time chart of the output current of an upstream side air-fuel ratio at the time of start of fuel cut control.

Next, referring to FIGS. 15 and 16, an abnormality diagnosis system according to a first modification of the first embodiment will be explained. In the present modification, the abnormality diagnosis control is suspended in accordance with the trends when the output currents of the air-fuel ratio sensors 40, 41 have converged during fuel cut control.

In this regard, the output gains of the air-fuel ratio sensors 40, 41, as explained above, change according to the pressure of the exhaust gas around the air-fuel ratio sensors 40, 41. Therefore, even if a certain extent of time elapses after the start of fuel cut control, for example, if the pressure of the exhaust gas around the air-fuel ratio sensors 40, 41 fluctuates, sometimes the output currents of the air-fuel ratio sensors 40, 41 will not converge to constant values. This state is shown in FIG. 15. The solid line in FIG. 15 shows the trend in the output current If in the case where the output gain of the upstream side air-fuel ratio sensor 40 fluctuates during fuel cut control. On the other hand, the broken line in FIG. 15 shows the trend in the output current If in the case where the output gain of the upstream side air-fuel ratio sensor 40 fluctuates during fuel cut control.

In this regard, as explained above, the average value from the time $t_2$ to the time $t_3$ of the output current If of the upstream side air-fuel ratio sensor 40 is calculated as the output converged value Ifcon. Therefore, as shown by the broken line in the figure, if the output gain of the upstream side air-fuel ratio sensor 40 does not fluctuate during fuel cut control, the calculated output converged value is calculated as Ifcon. On the other hand, as shown by the solid line in the figure, if the output gain of the upstream, side air-fuel ratio sensor 40 fluctuates from the time $t_2$ to the time $t_3$ during fuel cut control, the calculated output converged value becomes a value different from the Ifcon$_1$, that is, Ifcon$_2$. In this way, if the output gain of the upstream side air-fuel ratio sensor 40 fluctuates in the measurement period (time $t_2$ to time $t_3$) for calculating the output converged value, the value becomes different from when the output gain is not fluctuating. As a result, if the output gain fluctuates, the calculated output converged value Ifcon becomes a value different from the value corresponding to the output gain while the output current If of the upstream side air-fuel ratio sensor 40 is changing from the low reference value Iflow to the high reference value Ifhigh. Therefore, depending on the calculated output converged value Ifcon, it is not possible to calculate a suitable response time correction amount and, as a result, it is not possible to suitably correct the rising time Δtup.

Therefore, in the present, modification, when the output current If of the upstream side air-fuel ratio sensor 40 greatly fluctuates in the measurement period for calculation of the output converged value of the upstream side air-fuel ratio sensor 40 during fuel cut control, the upstream side air-fuel ratio sensor 40 is not diagnosed for abnormality. Specifically, in the present modification, in calculation of the output converged value of the upstream side air-fuel ratio sensor 40, if the difference between the maximum value and the minimum value of the output current If while cumulatively adding the output current If (time $t_2$ to time $t_3$ of FIG. 15) is larger than a predetermined diagnosis suspension reference value, abnormality is not diagnosed. Due to this, when it is not possible to suitably detect the rising time Δtup, the abnormality diagnosis of the upstream side air-fuel ratio sensor 40 is not performed and therefore unsuitable abnormality diagnosis being performed can be prevented.

Note that, in the above modification, the difference between the maximum value and minimum value of the output current If during calculation of the output converged value is used as the basis to determine whether abnormality diagnosis should be performed. However, it may be determined as to whether the abnormality diagnosis may be performed, based on a parameter other than the difference between the maximum value and the minimum value, as long as the parameter shows the extent of fluctuation of the output current If. As such a parameter, for example, the maximum rate of change or average rate of change (average of absolute values of rate of change) at the output current If of the upstream side air-fuel ratio sensor 40 during the measurement period for calculation of the output converged value, etc., may be mentioned. In this case, if the maximum rate of change or average rate of change at the output current If is larger than a predetermined diagnosis suspension reference value, the abnormality diagnosis is not performed. That is, in the present modification, when the value of the parameter which snows fluctuation of the output current If is a value which shows fluctuation larger than a predetermined diagnosis suspension reference value, the upstream, side air-fuel ratio sensor 40 is not diagnosed for abnormality. Note that, in the above example, the explanation was given with reference to the example of the upstream side air-fuel ratio sensor 40, but the invention can be similarly applied to the downstream side air-fuel ratio sensor 41 as well.

Figure 16:
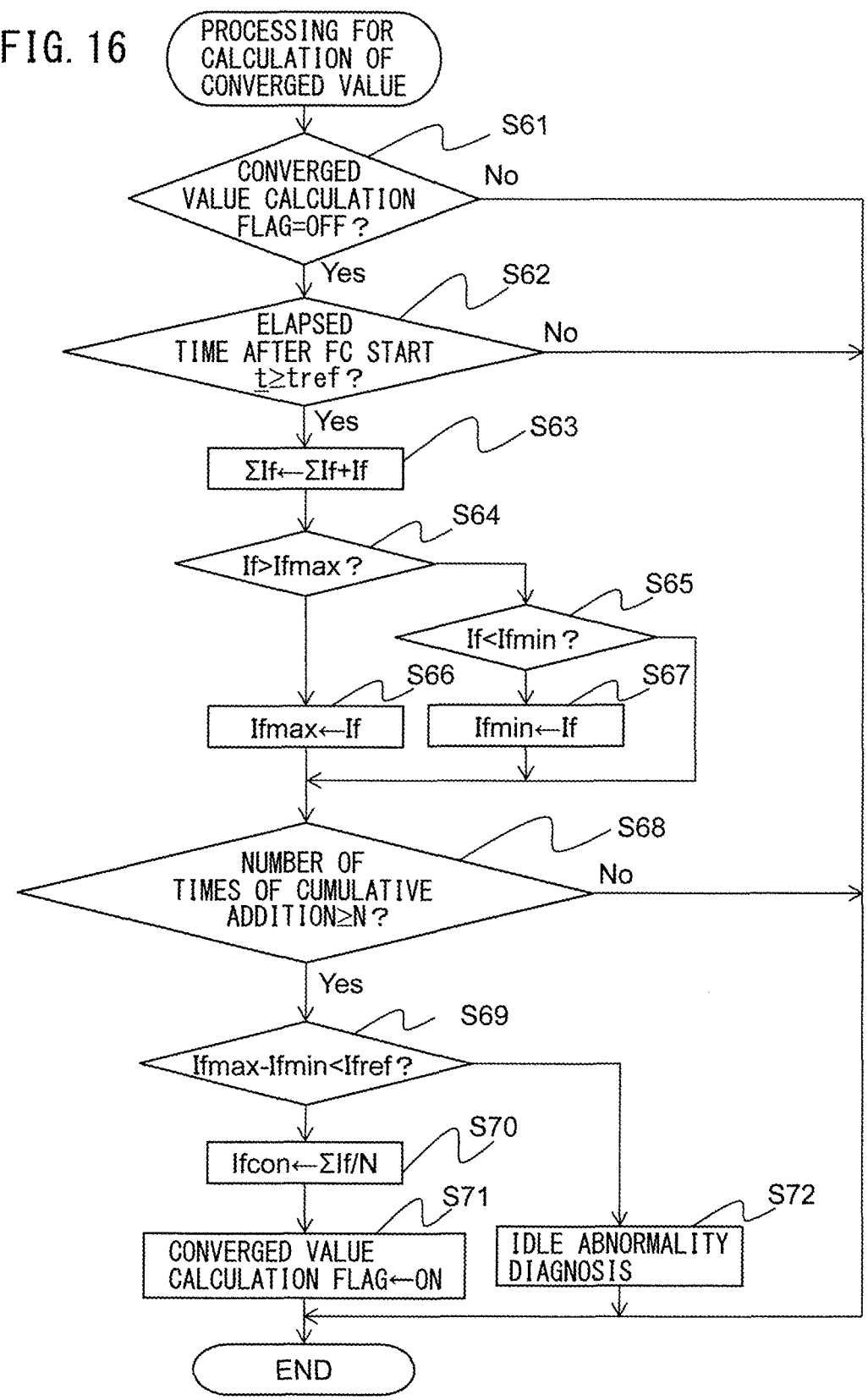
FIG. 16 is a flow chart, similar to FIG. 11, which shows a control routine of processing for calculating an output converged value.

FIG. 16 is a flow chart, similar to FIG. 11, which shows a control routine of processing for calculating the output converged value Ifcon. The control routine shown in FIG. 16 is performed at step S12 of FIG. 10. Note that, steps S61 to S63, S68, and S70 to S71 of FIG. 16 are similar to steps S31 to S36 of FIG. 11, and therefore the explanation will be omitted.

At step S64 of FIG. 16, it is judged if the output current If of the current upstream side air-fuel ratio sensor 40 is larger than the currently stored output maximum value Ifmax. At step S65, it is judged if the output current If of the current upstream side air-fuel ratio sensor 40 is smaller than the currently stored output minimum value Ifmin. If it is judged at steps S64 and S65 that the current output current. If is larger than the output maximum value Ifmax, the routine proceeds to step S66. At step S66, the current output, current If is set to the output maximum value Ifmax, that is, the output maximum value Ifmax is updated, then the routine proceeds to step S68. On the other hand, if, at steps S64, S65, it is judged that, the current output current If is smaller than the output minimum value Ifmin, the routine proceeds to step S67. At step S67, the current output current If is set to the output minimum value Ifmin, that, is, the output minimum value Ifmin is updated, then the routine proceeds to step S68. In addition, if, at steps S64, S65, the current output current. If is equal to or greater than the output minimum value Ifmin and is equal to or less than the output maximum value Ifmax, the routine proceeds to step S68 without going through steps S66, S67.

At step S68, it is judged if the number of cumulative additions of the output current If is equal to or greater than N times. If it is judged that it is equal to or greater than N times, the routine proceeds to step S69. At step S69, it is judged if the difference ΔIf (Ifmax−Ifmin) between the output maximum value Ifmax and the output minimum value Ifmin is smaller than a predetermined diagnosis suspension reference value Ifref. If it is judged, that the difference ΔIf is smaller than the diagnosis suspension reference value Ifref, that, is, the fluctuation of the output current If during calculation of the output converged value is small, the routine proceeds to step S70. On the other hand, if it is judged that the difference ΔIf is equal to or greater than the diagnosis suspension reference value Ifref, that is, if the fluctuation of the output current If during calculation of the output converged value is large, the routine proceeds to step S72, At step S72, the abnormality diagnosis of the upstream side air-fuel ratio sensor 40 is temporarily idled and the control routine is ended.

<Second Modification of First Embodiment>

Next, referring to FIG. 17, an abnormality diagnosis system according to a second modification of the first embodiment of the present invention will be explained. In the present modification, performance of abnormality diagnosis control is suspended in accordance with the output converged values of the air-fuel ratio sensors 40, 41.

In this regard, the relationship between an output converged value and the response time correction amount (rising time correction amount), which is shown in FIG. 8, is calculated by using air-fuel ratio sensors 40, 41, in which no deterioration in response has occurred, and changing the output gain. At this time, the output gain is changed from a value where the output gain is too small and thus is judged to be abnormal (reducing abnormality detection level) to a value where the output gain is too large and thus is judged to be abnormal (enlarging abnormality detection level). Therefore, even if the actual output gain is smaller than the reducing abnormality detection level, the response time correction amount is set to a correction amount which corresponds to the reducing abnormality detection level. Similarly, even if the actual output gain is larger than the enlarging abnormality detection level, the response time correction amount is set to a correction amount which corresponds to the enlarging abnormality detection level.

As a result, even if using air-fuel ratio sensors 40, 41 in which no deterioration in response has occurred, when the output gain is smaller than the reducing abnormality detection level, the calculated response time becomes too long, and therefore depending on the response time correction amount, the response time cannot be corrected to become sufficiently short. Therefore, regardless of using air-fuel ratio sensors 40, 41 in which no deterioration in response has occurred, it is judged that deterioration in response has occurred in the air-fuel ratio sensors 40, 41 based on the corrected response time. On the other hand, even when using air-fuel ratio sensors 40, 41 in which deterioration in response has occurred, when the output gain is larger than the enlarging abnormality detection level, the calculated response time becomes too short, and therefore by the response time correction amount, the response time can be corrected to become sufficiently long. As a result, regardless of using an air-fuel ratio sensor 40 in which deterioration in response has occurred, it is judged that no deterioration in response has occurred in the air-fuel ratio sensor 40 based on the corrected response time.

Therefore, in the present embodiment, when in this way the output gain is equal to or greater than a certain extent of a large value (for example, enlarging abnormality detection level) or when the output gain is equal to or less than a certain extent of a small value (for example, reducing abnormality detection level), the air-fuel ratio sensor 40 is not judged for abnormality.

Figure 17:
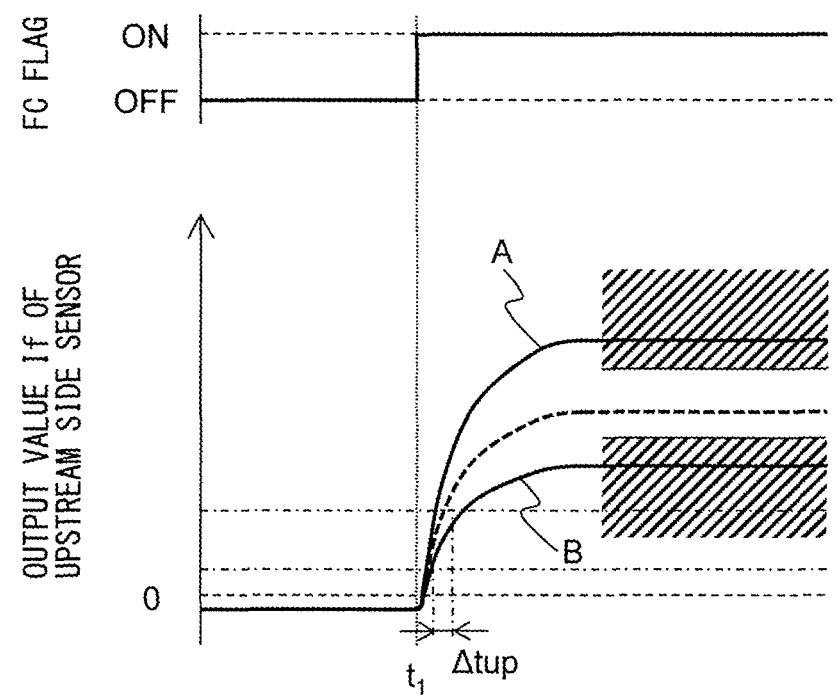
FIG. 17 is a time chart of an output current of an upstream side air-fuel ratio sensor at the time of start of fuel cut control.

Referring to FIG. 17, the modification will be specifically explained. FIG. 17 is a time chart of the output current If of the upstream side air-fuel ratio sensor 40 at the time of start of fuel cut control. The broken line in the figure shows the trend in the output value of the upstream side air-fuel ratio sensor 40 when the output gain is a suitable value. If the output converged value Ifcon of the upstream side air-fuel ratio sensor 40, as shown in FIG. 17 by the solid line A, is equal to or greater than a predetermined high side diagnosis suspension reference value (for example, corresponding to enlarging abnormality detection level), the upstream side air-fuel ratio sensor 40 is not diagnosed for abnormality. Similarly, when the output converged value Ifcon of the upstream side air-fuel ratio sensor 40, as shown in FIG. 17 by the solid line B, is equal to or less than a predetermined low side diagnosis suspension reference value (for example, corresponding to the reducing abnormality detection level), the upstream side air-fuel ratio sensor 40 is not diagnosed for abnormality. That is, in the present modification, if the output converged value when the output current of the air-fuel ratio sensor converges after the start of fuel cut control, is a value outside a predetermined range (for example, corresponding to range larger than reducing abnormality detection level and smaller than enlarging abnormality detection level), the upstream side air-fuel ratio sensor 40 is not diagnosed for abnormality.

Due to this, even if the output gain of the air-fuel ratio sensor 40 becomes equal to or less than the reducing abnormality detection level or equal to or greater than the enlarging abnormality detection level, deterioration in response can be suitably diagnosed.

<Second Embodiment>

Next, referring to FIGS. 18 and 19, an abnormality diagnosis system of a second embodiment of the present invention will be explained. The configuration and control of an abnormality diagnosis system of the second embodiment are basically the same as the configuration and control of the abnormality diagnosis system of the first embodiment.

In this regard, in the above embodiment, the rising time Δtup and falling time Δtdwn were corrected based on the output converged values of the air-fuel ratio sensors 40, 41. However, in the present embodiment, the high reference value Ifhigh and low reference value Iflow are changed based on the output converged values of the air-fuel ratio sensors 40, 41 during fuel cut control.

Figure 18:
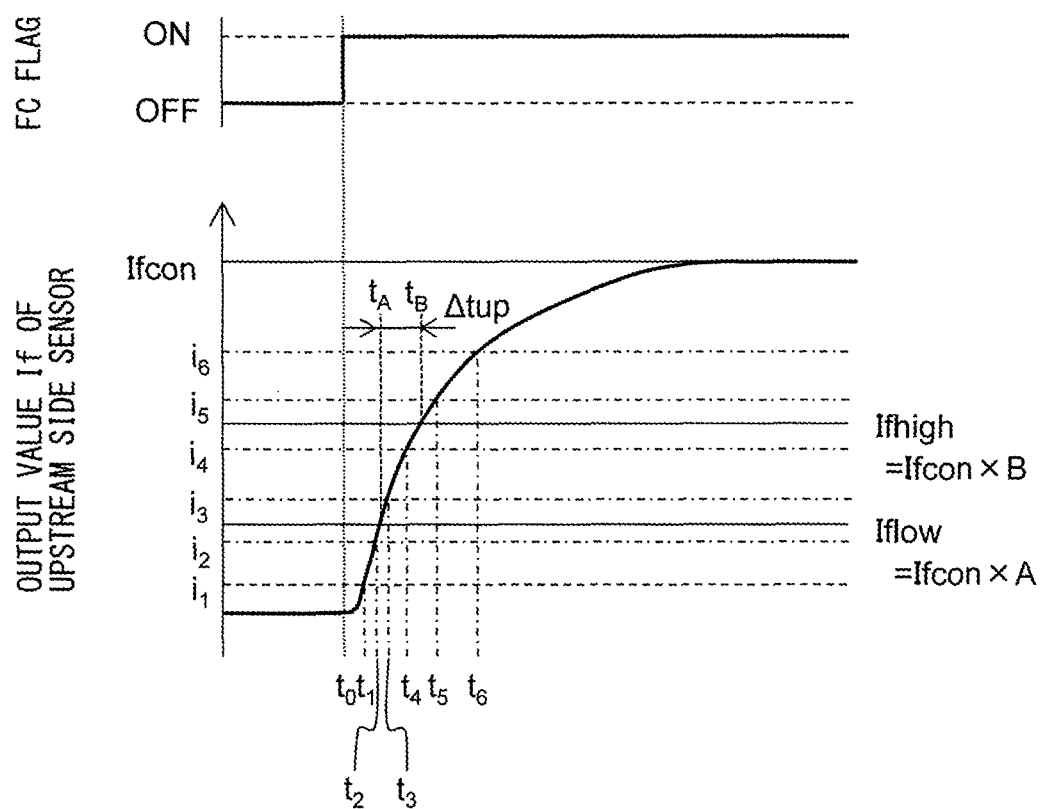
FIG. 18 is a time chart of an output current of an upstream side air-fuel ratio sensor at the time of start of fuel cut control.

Specifically, first, if fuel cut control is started at the time to of FIG. 18, the output current If of the upstream side air-fuel ratio sensor 40 is consecutively detected, and the measured output current If is stored together with the measured time at each constant time interval or constant output value interval in the RAM 33 of the ECU 31. Then, in the same way as the above-mentioned embodiment, the output converged value Ifcon is calculated. The calculated output converged value Ifcon is multiplied with the low reference value coefficient A to calculate the low reference value Iflow (Iflow=Ifcon×A). In this regard, the low reference value coefficient A is set to a value larger than 0 and smaller than 1. In addition, the calculated output converged value Ifcon is multiplied with a high reference value coefficient B to calculate the high reference value Ifhigh (Ifhigh=Ifcon×B). In this regard, the high reference value coefficient B is set to a value larger than 0 and smaller than 1 and is set to a value larger than the low reference value coefficient A.

Then, as shown in FIG. 18, the time $t_A$ when the output, current If reaches the low reference value Iflow and the time $t_B$ when it reaches the high reference value Ifhigh are calculated, based on the output current If of the upstream side air-fuel ratio sensor 40 and the time it is reached, which are stored in the RAM 33. By calculating the difference between the thus calculated time $t_A$ and time $t_B$, the rising time Δtup is calculated. If this rising time Δtup is equal to or greater than a predetermined abnormality judgment reference rising time, it is judged that the air-fuel ratio sensors 40, 41 have become abnormal. Due to this, according to the present embodiment, it is possible to accurately diagnosis abnormality of the upstream side air-fuel ratio sensor 40. Further, a similar technique can be used to diagnosis abnormality of the downstream side air-fuel ratio sensor 41.

In this regard, after the start of fuel cut control, if the relationship between the time and the output current If of the upstream side air-fuel ratio sensor 40 is successively stored in the RAM 33, the RAM 33 has to have a large storage capacity. Therefore, in the present embodiment, only the times $t_1$ to $t_6$ when the output current If of the upstream side air-fuel ratio sensor 40 reaches the predetermined plurality of output reference values $i_1$ to $i_6$, are stored in the RAM 33 (see FIG. 18). In this regard, the plurality of output reference values $i_1$ to $i_6$ are set to values of 0 or more and smaller than the output current corresponding to the atmospheric gas, and are set to values which become gradually larger from the output reference values $i_1$ to $i_6$ ($i_1 < i_2 < i_3 < \ldots$). Further, the output reference values $i_1$ to $i_6$ are set to values which are separated from adjoining values by exactly the same values (for example, $i_3 - i_2 = i_2 - i_1$). Note that, in the illustrated example, six output reference values $i_1$ to $i_6$ are used, but the number may be greater than or smaller than this.

Then, the output converged value Ifcon is calculated and this output converged value Ifcon is used to calculate the high reference value Ifhigh and low reference value Iflow. However, the thus calculated high reference value Ifhigh and low reference value Iflow in many cases do not match the output reference values $i_1$ to $i_6$. Therefore, in the present embodiment, the times (in the example shown in FIG. 18, $t_4$ and $t_5$) when reaching the two output reference values (in the example shown in FIG. 18, $i_4$ and $i_5$) closest to the thus calculated high reference value Ifhigh are used as the basis to calculate the time $t_B$ when reaching the high reference value Ifhigh, by using a formula such as the following formula (1):

$$t_B = (t[x+1] - t[x])/(i[x+1] - i[x]) \times (Ifhigh - i[x]) + t[x] \quad (1)$$

Note that, in the above formula (1), i[x] is selected so that i[x]≤Ifhigh<i[x+1]. Therefore, in the example shown in FIG. 18, i(x) is $i_4$.

Similarly, the times when reaching two output reference values (in the example shown in FIG. 18, $t_2$ and $t_3$) closest to the low reference value Iflow (in the example which in FIG. 18, $i_2$ and $i_3$) are used as the basis to calculate the time $t_A$ when reaching the low reference value Iflow, by using the following formula.

$$t_A = (t[y+1] - t[y])/(i[y+1] - i[y]) \times (Iflow - i[y]) + t(y) \quad (2)$$

In this regard, in the above formula (2), i[y] is selected so that i[y]≤Iflow<i[y+1].

In this way, the RAM 33 of the ECU 31 stores only the times at which the plurality of output reference values are reached, and the times when the calculated high reference value Ifhigh and low reference value Iflow are reached are estimated based on the stored time data. Therefore, it is possible to reduce the amount of data stored in the RAM 33. Note that, this technique may also be used for abnormality diagnosis of the downstream side air-fuel ratio sensor 41.

Note that, in the above embodiment, the relationship between the time and the output value of an air-fuel ratio sensor at that time is stored in the RAM 33 as data, every constant output value interval. However, this relationship may also be stored every constant time interval. In this case, a predetermined plurality of times (that is, the elapsed times from the start of fuel cut control) and the output current If of the upstream side air-fuel ratio sensor 40 at these times are stored as data in the RAM 33. In this case, the time for reaching the high reference value Ifhigh and low reference value Iflow are estimated based on the stored data of the output current by using formulas similar to the above formula (1) and formula (2).

That is, in the present embodiment, after the start of fuel cut control, the relationships between the current time and the output values of the air-fuel ratio sensors 40, 41 at that time are stored every constant time interval or every constant output value interval. In addition, the low lean reference value and high lean reference value are corrected based on the detected output converged value. Further, the times when the output values of the air-fuel ratio sensors reach the corrected low lean reference value and high lean reference value are calculated based on the relationships between the stored time and output values. As a result, the response times are calculated.

<Flow Chart>

Figure 19:
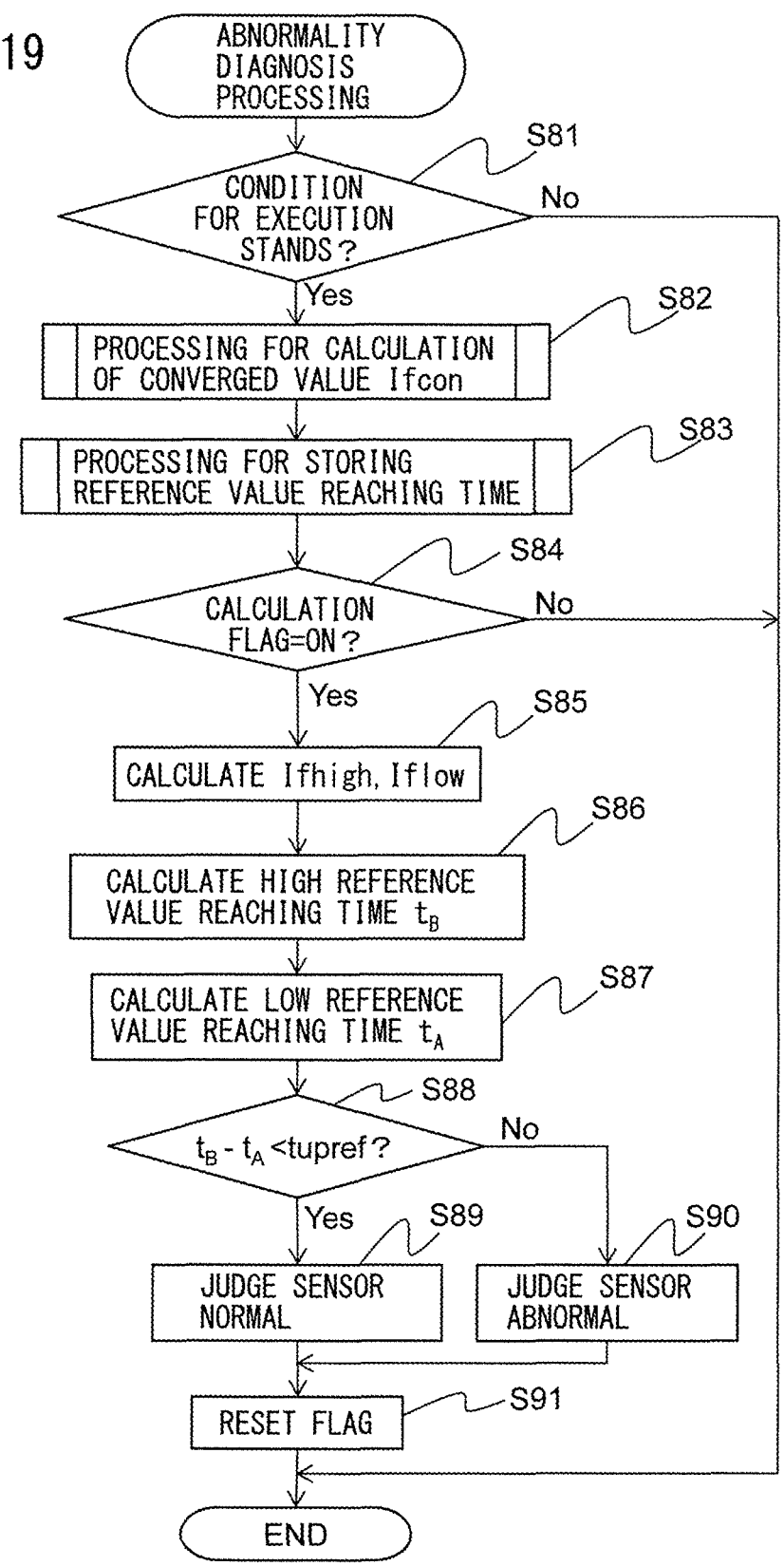
FIG. 19 is a flow chart which shows a control routine of abnormality diagnosis processing of an upstream side air-fuel ratio sensor, which is performed in an abnormality diagnosis system of a second embodiment.

FIG. 19 is a flow chart which shows the control routine of abnormality diagnosis processing of the upstream side air-fuel ratio sensor 40 which is performed by the abnormality diagnosis system of the present embodiment. The illustrated control routine is performed by interruption every constant time interval.

In the example shown in FIG. 19, first, at step S81, in the same way as step S11 of FIG. 10, it is judged if the condition for performing the abnormality diagnosis processing stands. Next, at step S82, processing for calculating the output converged value Ifcon, which is shown in FIG. 11, is performed. Next, at step S83, the times $t_1$ to $t_6$ when the plurality of output reference values $i_1$ to is are reached are detected based on the output current If of the upstream side air-fuel ratio sensor 40 after the start of fuel cut control. The detected times $t_1$ to $t_6$ are stored, linked with the output reference values $i_1$ to $i_6$, in the ROM 33 of the ECU 31. If the times $t_1$ to $t_6$ at which all of the output reference values $i_1$ to is are reached are detected and stored, the reaching time calculation flag is set ON.

Next, at step S84, it is judged if the converged value calculation flag and the reaching time calculation flag have become ON. As explained above, the reaching time calculation flag is a flag which is set ON when the times, at which all of the output reference values are reached, are detected and stored, and is set OFF before that. If at step S84 it is judged that at least one of the converged value calculation flag and reaching time calculation flag is OFF, data sufficient, for abnormality diagnosis of the upstream side air-fuel ratio sensor 40 is not collected, and therefore the control routine is ended.

On the other hand, if it is judged at step S84 that the converged value calculation flag and the reaching time calculation flag have become ON, the routine proceeds to step S85. At step S85, the output converged value Ifcon calculated at step S82 is multiplied with the high reference value coefficient B to calculate the high reference value Ifhigh. In addition, the calculated output converged value Ifcon is multiplied with the low reference value coefficient A to calculate the low reference value Iflow. Next, at step S86, the high reference value reaching time $t_B$ is calculated by the above formula (1) based on the output reference value and the reaching time thereof, which were detected and stored at step S83, and the high reference value Ifhigh which was calculated at step S85. At step S87, the low-reference value reaching time $t_A$ is calculate by the above formula (2) based on the output reference value and the reaching time thereof, which were detected and stored at step S83, and the low reference value Iflow which was calculated at step S85.

Next, at step S88, it is judged if the rising time Δtup ($=t_B-t_A$) obtained by subtracting the low reference value reaching time $t_A$ which was calculated at step S87 from the high reference value reaching time $t_B$ which was calculated at step S86, is shorter than the abnormality judgment reference rising time tupref. If it is judged that the rising time Δtup is shorter than the abnormality judgment reference rising time tupref, the routine proceeds to step S89. At step S89, it is judged that the upstream side air-fuel ratio sensor 40 is normal and the routine proceeds to step S91. On the other hand, when it is judged at step S88 that the rising time Δtup is equal to or greater than an abnormality judgment reference rising time tupref, the routine proceeds to step S90. At step S90, it is judged that the upstream side air-fuel ratio sensor 40 is abnormal and the alarm lamp is turned on, then the routine proceeds to step S91. At step S91, the converged value calculation flag and the reaching time calculation flag are reset to OFF and the control routine is ended.

<Modification of Second Embodiment>

Next, referring to FIGS. 20A and 20B, an abnormality diagnosis system according to a modification of a second embodiment of the present invention will be explained. In the present modification, the performance of abnormality diagnosis control is suspended in accordance with the output converged values of the air-fuel ratio sensors 40, 41 after fuel cut control.

Figure 20A:
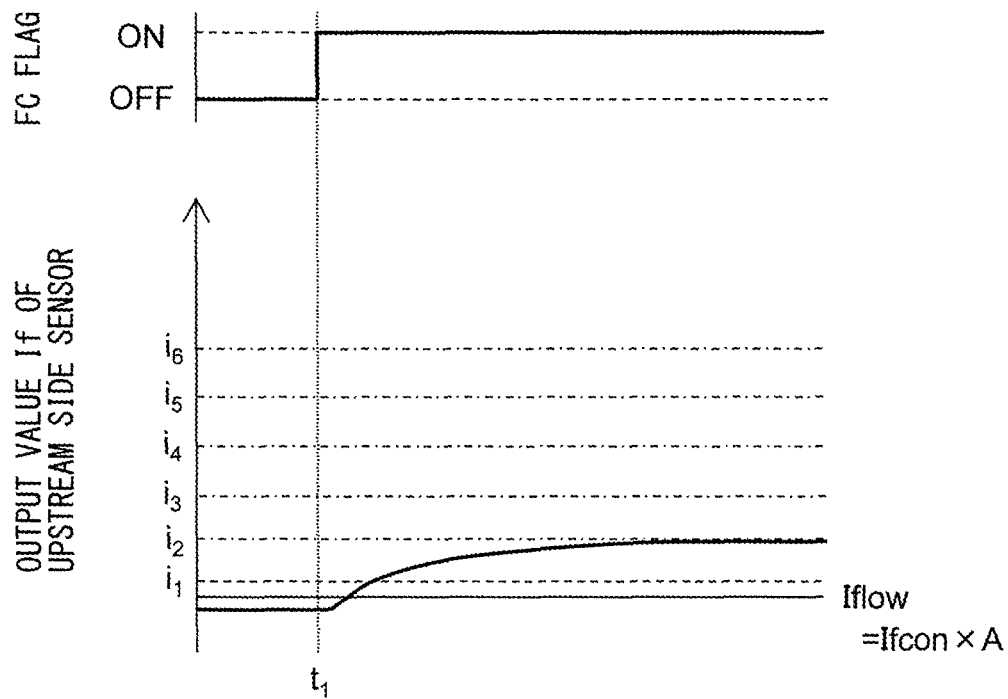
FIGS. 20A and 20B are time charts of an output current of an upstream side air-fuel ratio sensor at the time of start of fuel cut control.
Figure 20B:
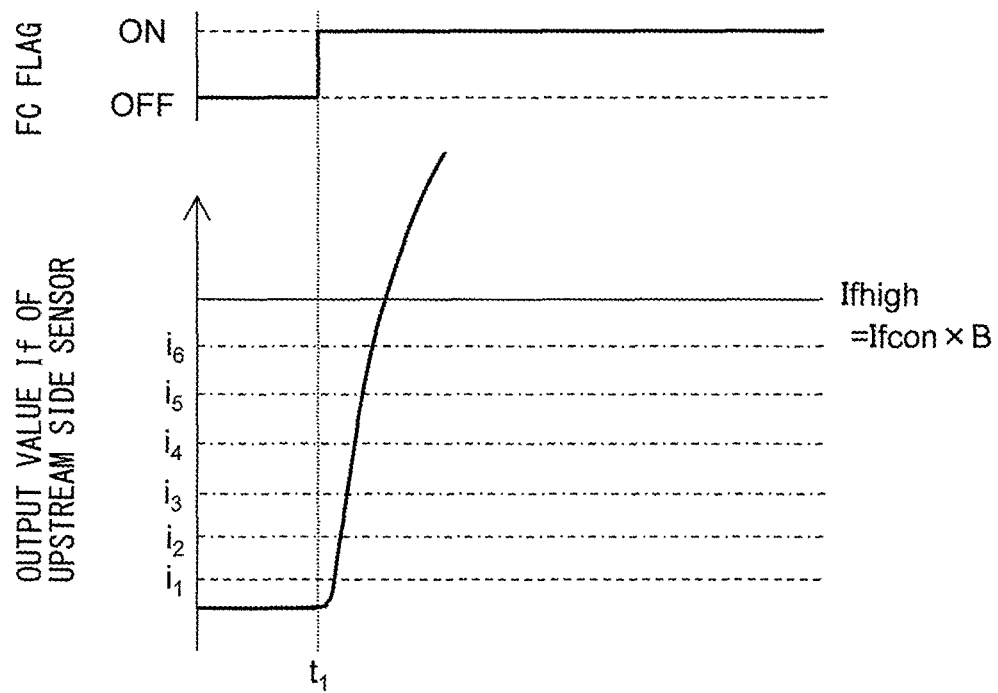

In this regard, as shown in FIG. 18, in the case where the high reference value and low reference value are calculated based on the output converged value of the upstream side air-fuel ratio sensor 40, if the output converged value Ifcon is too small, as shown in FIG. 20A, the calculated low reference value Iflow becomes a value lower than the lowest output reference value $i_1$ among the plurality of output reference values $i_1$ to $i_6$. Similarly, if the output converged value Ifcon is too large, as shown in FIG. 20B, the calculated high reference value Ifhigh becomes a value higher than the highest output reference value $i_6$ among the plurality of output reference values $i_1$ to $i_6$.

Therefore, in the present embodiment, if the output converged value is equal to or greater than a predetermined upper side diagnosis suspension reference value or if the output converged value is equal to or less than a predetermined lower side diagnosis suspension reference value, the upstream side air-fuel ratio sensor 40 is not judged for abnormality. That is, in the present modification, if the output converged value when the output current, of the air-fuel ratio sensor converges after the start of fuel cut control is a value outside a predetermined range (range lower than upper side diagnosis suspension reference value and higher than upper side diagnosis suspension reference value), the upstream side air-fuel ratio sensor 40 is not diagnosed for abnormality.

Note that, the upper side diagnosis suspension reference value is set to a value so that the nigh reference value Ifhigh which is calculated based on the upper side diagnosis suspension reference value becomes the highest output reference value $i_6$ among the plurality of output reference values $i_1$ to $i_6$. Further, the lower side diagnosis suspension reference value is set to a value so that the low reference value Iflow which is calculated based on the lower side diagnosis suspension reference value becomes the lowest output reference value $i_1$ among the plurality of output reference values $i_1$ to $i_6$. Alternatively, in the same way as the second modification of the first embodiment, the upper side diagnosis suspension reference value and the lower side diagnosis suspension reference value may also be values which correspond to the enlarging abnormality detection level and reducing abnormality detection level of the output gain, respectively.

Finally, if summarizing the first embodiment, and second embodiment, in the present invention, a response parameter which shows the responses of the air-fuel ratio sensors (for example, the above-mentioned response time or rate of change with time) is calculated, based, on the output values of the air-fuel ratio sensors 40, 41 during the time period in which the output values of the air-fuel ratio sensors 40, 41 change along with the start of performance or end of performance of fuel cut control. Further, the calculated value of the response parameter and abnormality judgment threshold value (abnormality judgment reference response time or abnormality judgment reference rate of change) are compared to diagnose an abnormality relating to the responses of the air-fuel ratio sensors.

In addition, the converged values when the output values of the air-fuel ratio sensors 40, 41 have converged to values equivalent to the lean air-fuel ratio are detected during fuel cut control. Further, at least one of the value of the response parameter, the value of a parameter which is used for calculation of the response parameter (for example, high reference value or low reference value), and abnormality judgment threshold value is corrected so that the smaller the lean degree of the air-fuel ratio which corresponds to the detected converged value, the faster the response of the air-fuel ratio sensors 40, 41 is treated as compared with the response corresponding to the value of the calculated response parameter. Further, abnormality of the response of the air-fuel ratio sensor is diagnosed based on the corrected calculated value of the response parameter and the abnormality judgment threshold value.

REFERENCE SIGNS LIST 1. engine body
5. combustion chamber
7. intake port
9. exhaust port
19. exhaust manifold
20. upstream side exhaust purification catalyst
24. downstream side exhaust purification catalyst
31. ECU 40. upstream side air-fuel ratio sensor
41. downstream side air-fuel ratio sensor

The invention claimed is:

1. An abnormality diagnosis system of an air-fuel ratio sensor provided in an exhaust passage of an internal combustion engine, the internal combustion engine can perform fuel cut control, which stops or reduces feed of fuel to a combustion chamber, and the air-fuel ratio sensor detects an air-fuel ratio of exhaust gas flowing through said exhaust passage, the abnormality diagnosis system comprising:
an electronic control unit operatively connected to the internal combustion engine and the air-fuel ratio sensor, the electronic control unit configured to:
calculate a response parameter which shows a response of the air-fuel ratio sensor, based on an output value of said air-fuel ratio sensor in a time period during which the output value of said air-fuel ratio sensor changes along with the start of performance or end of performance of said fuel cut control;
compare a calculated value of said response parameter and a predetermined threshold value to diagnose an abnormality relating to response of said air-fuel ratio sensor;
detect a converged value when an output value of said air-fuel ratio sensor converges to a value corresponding to a lean air-fuel ratio which is leaner than a stoichiometric air-fuel ratio during said fuel cut control;
correct at least one of a value of said response parameter, a value of a parameter which is used for calculation of said response parameter, and said threshold value so that the smaller the lean degree of the air-fuel ratio which corresponds to said detected converged value becomes, the faster the response of said air-fuel ratio sensor is treated as compared with the response which corresponds to the value of the calculated response parameter; and
diagnose abnormality of the response of said air-fuel ratio sensor based on the value of the response parameter calculated after the correction and said threshold value.

2. The abnormality diagnosis system of an air-fuel ratio sensor according to claim 1, wherein
said response parameter is an output changing time which is taken for an output value of said air-fuel ratio sensor to change from a low lean reference value which corresponds to a lean air-fuel ratio to a high lean reference value which corresponds to an air-fuel ratio which is leaner than the air-fuel ratio which corresponds to said low lean reference value during said time period along with the start of said fuel cut control, or an output changing time which is taken for an output value of said air-fuel ratio sensor to change from said high lean reference value to said low lean reference value during said time period along with the end of said fuel cut control, and
the electronic control unit is configured to judge that said air-fuel ratio sensor has become abnormal when said output changing time is equal to or greater than a predetermined threshold value.

3. The abnormality diagnosis system of an air-fuel ratio sensor according to claim 2, wherein the electronic control unit is configured to correct said output changing time to make it shorter or corrects said threshold value to make it larger, the smaller the lean degree of the air-fuel ratio corresponding to the detected converged value.

4. The abnormality diagnosis system of an air-fuel ratio sensor according to claim 1, wherein
said response parameter is a rate of change with time of an output value of said air-fuel ratio sensor while the output value changes from a low lean reference value which corresponds to a lean air-fuel ratio to a high lean reference value which corresponds to an air-fuel ratio leaner than an air-fuel ratio corresponding to said low lean reference value, during said time period, along with the start of said fuel cut control, or a rate of change with time of the output value while an output value of said air-fuel ratio sensor changes from said high lean reference value to said low lean reference value, during said time period, along with the end of said fuel cut control, and
the electronic control unit is configured to judge that said air-fuel ratio sensor has become abnormal when said rate of change with time is equal to or less than a predetermined threshold value.

5. The abnormality diagnosis system of an air-fuel ratio sensor according to claim 4, wherein the electronic control unit is configured to correct said rate of change with time to become larger or corrects said threshold value to become smaller, the smaller the lean degree of the air-fuel ratio corresponding to said detected converged value.

6. The abnormality diagnosis system of an air-fuel ratio sensor according to claim 2, wherein the electronic control unit is configured to correct the low lean reference value and high lean reference value so that the smaller the lean degree of the air-fuel ratio which corresponds to said detected converged value, the smaller the difference between the air-fuel ratio which corresponds to said low lean reference value and the air-fuel ratio which corresponds to said high lean reference value.

7. The abnormality diagnosis system of an air-fuel ratio sensor according to claim 4, wherein the electronic control unit is configured to correct the low lean reference value and high lean reference value so that the smaller the lean degree of the air-fuel ratio which corresponds to said detected converged value, the smaller the difference between the air-fuel ratio which corresponds to said low lean reference value and the air-fuel ratio which corresponds to said high lean reference value.

8. The abnormality diagnosis system of an air-fuel ratio sensor according to claim 1, wherein the electronic control unit is configured to use as the converged value of the output value of said air-fuel ratio sensor during said fuel cut control, an average value of output values of said air-fuel ratio sensor in a measurement period from when it is judged an output value of said air-fuel ratio sensor has converged during said fuel cut control to when a predetermined time has elapsed therefrom, and
wherein the electronic control unit is configured to not diagnosis said air-fuel ratio sensor for abnormality when the value of a parameter which shows fluctuation of the output value of said air-fuel ratio sensor during said measurement period is a value which shows that fluctuation of the output value is larger than a diagnosis suspension reference value.

9. The abnormality diagnosis system of an air-fuel ratio sensor according to claim 1, wherein the electronic control unit is configured not to diagnose abnormality of said air-fuel ratio sensor when said converged value is a value outside a predetermined range.

10. The abnormality diagnosis system of an air-fuel ratio sensor according to claim 1 further comprising an alarm lamp operatively connected to the electronic control unit, wherein the electronic control unit is configured to activate the alarm lamp when the air-fuel ratio sensor is diagnosed as abnormal.

\* \* \* \* \*